United States Patent
Li et al.

(10) Patent No.: US 12,466,886 B2
(45) Date of Patent: Nov. 11, 2025

(54) METHOD OF TREATMENT USING A BISPECIFIC ANTIBODY BINDING BCMA AND CD3

(71) Applicant: Shandong New Time Pharmaceutical Co., Ltd., Shandong (CN)

(72) Inventors: Qiang Li, Shanghai (CN); Shixiang Jia, Shanghai (CN); Lili Zhao, Linyi (CN); Guimin Zhang, Linyi (CN); Zhong Liu, Linyi (CN); Xinlu Ma, Shanghai (CN); Yuan Yan, Shanghai (CN); Zhenyu Li, Linyi (CN); Xingxia Hu, Linyi (CN); Yuhua Zhang, Shanghai (CN); Bin Li, Linyi (CN)

(73) Assignee: SHANDONG NEW TIME PHARMACEUTICAL CO., LTD., Linyi (CN)

( * ) Notice: Subject to any disclaimer, the term of this patent is extended or adjusted under 35 U.S.C. 154(b) by 0 days.

(21) Appl. No.: 18/671,707

(22) Filed: May 22, 2024

(65) Prior Publication Data
US 2024/0301063 A1      Sep. 12, 2024

Related U.S. Application Data

(63) Continuation of application No. 17/290,401, filed as application No. PCT/CN2019/108057 on Sep. 26, 2019, now Pat. No. 12,030,939.

(30) Foreign Application Priority Data

Nov. 1, 2018   (CN) .......................... 201811294887.4

(51) Int. Cl.
A61K 39/395    (2006.01)
A61P 35/00     (2006.01)
(Continued)

(52) U.S. Cl.
CPC ...... *C07K 16/2809* (2013.01); *A61K 39/3955* (2013.01); *A61P 35/00* (2018.01);
(Continued)

(58) Field of Classification Search
None
See application file for complete search history.

(56) References Cited

U.S. PATENT DOCUMENTS 9,441,034 B2      9/2016   Sivakumar et al.
10,793,635 B2 *  10/2020   Kuo ..................... A61K 31/454
(Continued)

FOREIGN PATENT DOCUMENTS

CN    102741423 A    10/2012
CN    104114578 A    10/2014
(Continued)

OTHER PUBLICATIONS

Xu et al., The exploration of B cell maturation antigen expression in plasma cell dyscrasias beyond multiple myeloma, BMC 23:128, 9 pages, 2023.*
(Continued)

*Primary Examiner* — Claire Kaufman
(74) *Attorney, Agent, or Firm* — McCarter & English, LLP

(57) ABSTRACT

The invention provided herein relates to methods and uses of a bispecific antibody, which specifically binds the surface antigen CD3 of immune cells and the BCMA antigen on the surface of tumor cells and which may bind to human CD3 with high affinity, induce T cell proliferation, and mediate tumor cell killing effects. The bispecific antibody may be used to mediate the T cell-specific killing of target cells in in vitro tests.

1 Claim, 7 Drawing Sheets

Specification includes a Sequence Listing.

(51) Int. Cl.
  *C07K 16/28* (2006.01)
  *C07K 16/46* (2006.01)
  *C12N 15/62* (2006.01)
  *C12N 15/85* (2006.01)
  *A61K 39/00* (2006.01)

(52) U.S. Cl.
  CPC ...... *C07K 16/2803* (2013.01); *C07K 16/2878* (2013.01); *C07K 16/468* (2013.01); *C12N 15/62* (2013.01); *C12N 15/85* (2013.01); *A61K 2039/505* (2013.01); *C07K 2317/24* (2013.01); *C07K 2317/31* (2013.01); *C07K 2317/33* (2013.01); *C07K 2317/35* (2013.01); *C07K 2317/52* (2013.01); *C07K 2317/524* (2013.01); *C07K 2317/526* (2013.01); *C07K 2317/53* (2013.01); *C07K 2317/565* (2013.01); *C07K 2317/622* (2013.01); *C07K 2317/73* (2013.01)

(56) References Cited

U.S. PATENT DOCUMENTS

| 12,030,939 | B2 | 7/2024 | Li et al. |
| 2009/0252683 | A1 | 10/2009 | Kischel et al. |
| 2017/0218077 | A1 | 8/2017 | Raum et al. |
| 2017/0327579 | A1 | 11/2017 | Vu et al. |
| 2019/0184026 | A1 | 6/2019 | Li et al. |
| 2020/0157185 | A1 | 5/2020 | Gao et al. |

FOREIGN PATENT DOCUMENTS

| CN | 105358570 A | 2/2016 |
| CN | 105658668 A | 6/2016 |
| CN | 105980406 A | 9/2016 |
| CN | 106279418 A | 1/2017 |
| CN | 106317226 A | 1/2017 |
| CN | 107286248 A | 10/2017 |
| CN | 107759694 A | 3/2018 |
| CN | 108350076 A | 7/2018 |
| CN | 108474793 A | 8/2018 |
| WO | 2011/050262 A2 | 4/2011 |
| WO | 2012/066058 A1 | 5/2012 |
| WO | 2013/072406 A1 | 5/2013 |
| WO | 2014/140248 A1 | 9/2014 |
| WO | 2015/052536 A1 | 4/2015 |
| WO | 2017/072716 A1 | 5/2017 |
| WO | 2017/134134 A1 | 8/2017 |
| WO | 2017/223111 A1 | 12/2017 |
| WO | 2018/175279 A2 | 9/2018 |

OTHER PUBLICATIONS

Visram et al., Serum BCMA levels predict outcomes in MGUS and smoldering myeloma patients, Blood Canc. J. 11:120, Jun. 24, 2021.*
Hagan et al., BCMA-Targeted T-Cell-Engager Therapy for Autoimmune Disease, N. Engl. J. Med. 391:9, 3 pages, Sep. 5, 2024.*
Chakraborty et al., Safety and efficacy of teclistamab in systemic immunoglobulin light chain amyloidosis, Blood Canc. J. 13:172, 4 pages, 2023.*
Dogan et al., B-cell maturation antigen expression across hematologic cancers: a systematic literature review, Blood. Canc. J. 10: 73, 13 pages, 2020.*
Xu et al., Anti-BCMA CAR-T cells for treatment of plasma cell dyscrasia: case report on POEMS syndrome and multiple myeloma, J. Meatol. Oncol. 11:128, 9 pages, 2018.*
Alexander et al., Teclistamab-Induced Remission in Refractory Systemic Lupus Erythematosus, N. Eng. J. Med. 391:864-866, 2024.*
Ahamadi-Fesharaki et al., Single-Chain Variable Fragment-Based Bispecific Antibodies: Hitting Two Targets with One Sophisticated Arrow. Mol Ther Oncolytics. Mar. 23, 2019;14:38-56.
Asano et al., Cytotoxic enhancement of a bispecific diabody by format conversion to tandem single-chain variable fragment (taFv): the case of the hEx3 diabody. J Biol Chem. Jan. 21, 2011;286(3):1812-8.
Hipp et al., A novel BCMA/CD3 bispecific T-cell engager for the treatment of multiple myeloma induces selective lysis in vitro and in vivo. Leukemia. Aug. 2017;31(8):1743-1751.
Wenbing, Introduction to Biotechnological Pharmacy, 3rd Edition. China Medical Science Press. Bispecific Antibody, pp. 238-239, Aug. 31, 2015.
Wu et al., T cell engaging bispecific antibody (T-BsAb): From technology to therapeutics. Pharmacol Ther. Feb. 2018; 182:161-175.
Chinese Office Action for Application No. 201910915568.9, dated Mar. 16, 2022, 25 pages.
International Search Report and Written Opinion for Application No. PCT/CN2019/108057, dated Dec. 27, 2019, 23 pages.

* cited by examiner

SEQUENCE LISTING

```
Sequence total quantity: 29
SEQ ID NO: 1            moltype = AA  length = 5
FEATURE                 Location/Qualifiers
source                  1..5
                        mol_type = protein
                        note = HCDR1 of first single chain Fv of bispecific
                          antibody targeting CD3 and BCMA
                        organism = synthetic construct
SEQUENCE: 1
NYWMH                                                                     5

SEQ ID NO: 2            moltype = AA  length = 17
FEATURE                 Location/Qualifiers
source                  1..17
                        mol_type = protein
                        note = HCDR2 of first single chain Fv of bispecific
                          antibody targeting CD3 and BCMA
                        organism = synthetic construct
SEQUENCE: 2
ATYRGHSDTY YNQKFKG                                                        17

SEQ ID NO: 3            moltype = AA  length = 12
FEATURE                 Location/Qualifiers
source                  1..12
                        mol_type = protein
                        note = HCDR3 of first single chain Fv of bispecific
```

```
                         antibody targeting CD3 and BCMA
                         organism = synthetic construct
SEQUENCE: 3
GAIYDGYDVL DN                                                        12

SEQ ID NO: 4             moltype = AA   length = 11
FEATURE                  Location/Qualifiers
source                   1..11
                         mol_type = protein
                         note = LCDR1 of first single chain Fv of bispecific
                          antibody targeting CD3 and BCMA
                         organism = synthetic construct
SEQUENCE: 4
SASQDISNYL N                                                         11

SEQ ID NO: 5             moltype = AA   length = 7
FEATURE                  Location/Qualifiers
source                   1..7
                         mol_type = protein
                         note = LCDR2 of first single chain Fv of bispecific
                          antibody targeting CD3 and BCMA
                         organism = synthetic construct
SEQUENCE: 5
YTSNLHS                                                              7

SEQ ID NO: 6             moltype = AA   length = 9
FEATURE                  Location/Qualifiers
source                   1..9
                         mol_type = protein
                         note = LCDR3 of first single chain Fv of bispecific
                          antibody targeting CD3 and BCMA
                         organism = synthetic construct
SEQUENCE: 6
QQYRKLPWT                                                            9

SEQ ID NO: 7             moltype = AA   length = 121
FEATURE                  Location/Qualifiers
source                   1..121
                         mol_type = protein
                         note = VH domain of first single chain Fv of bispecific
                          antibody targeting CD3 and BCMA
                         organism = synthetic construct
SEQUENCE: 7
QVQLVQSGAE VKKPGSSVKV SCKASGGTFS NYWMHWVRQA PGQGLEWMGA TYRGHSDTYY     60
NQKFKGRVTI TADKSTSTAY MELSSLRSED TAVYYCARGA IYDGYDVLDN WGQGTLVTVS    120
S                                                                   121

SEQ ID NO: 8             moltype = AA   length = 107
FEATURE                  Location/Qualifiers
source                   1..107
                         mol_type = protein
                         note = VL domain of first single chain Fv of bispecific
                          antibody         targeting CD3 and BCMA
                         organism = synthetic construct
SEQUENCE: 8
DIQMTQSPSS LSASVGDRVT ITCSASQDIS NYLNWYQQKP GKAPKLLIYY TSNLHSGVPS     60
RFSGSGSGTD FTLTISSLQP EDFATYYCQQ YRKLPWTFGQ GTKLEIK                  107

SEQ ID NO: 9             moltype = AA   length = 28
FEATURE                  Location/Qualifiers
source                   1..28
                         mol_type = protein
                         note = full-length sequence consisting of amino acids at
                          positions 118 to 145 derived from the carboxyl terminal of
                          natural human chorionic gonadotropin beta subunit
                         organism = synthetic construct
SEQUENCE: 9
SSSSKAPPPS LPSPSRLPGP SDTPILPQ                                       28

SEQ ID NO: 10            moltype = AA   length = 27
FEATURE                  Location/Qualifiers
source                   1..27
                         mol_type = protein
                         note = linker peptide L2
                         organism = synthetic construct
SEQUENCE: 10
GGGGGGSGGG GSGGGGSSSS SKAPPPS                                        27

SEQ ID NO: 11            moltype = AA   length = 5
```

```
FEATURE                 Location/Qualifiers
source                  1..5
                        mol_type = protein
                        note = HCDR1 of second single chain Fv of bispecific
                          antibody targeting          CD3 and BCMA
                        organism = synthetic construct
SEQUENCE: 11
TYAMN                                                                       5

SEQ ID NO: 12           moltype = AA   length = 19
FEATURE                 Location/Qualifiers
source                  1..19
                        mol_type = protein
                        note = HCDR2 of second single chain Fv of bispecific
                          antibody targeting          CD3 and BCMA
                        organism = synthetic construct
SEQUENCE: 12
RIRSKYNNYA TYYADSVKD                                                       19

SEQ ID NO: 13           moltype = AA   length = 14
FEATURE                 Location/Qualifiers
source                  1..14
                        mol_type = protein
                        note = HCDR3 of second single chain Fv of bispecific
                          antibody targeting          CD3 and BCMA
                        organism = synthetic construct
SEQUENCE: 13
HGNFGNSYVS WFAY                                                            14

SEQ ID NO: 14           moltype = AA   length = 14
FEATURE                 Location/Qualifiers
source                  1..14
                        mol_type = protein
                        note = LCDR1 of second single chain Fv of bispecific
                          antibody targeting          CD3 and BCMA
                        organism = synthetic construct
SEQUENCE: 14
RSSTGAVTTS NYAN                                                            14

SEQ ID NO: 15           moltype = AA   length = 7
FEATURE                 Location/Qualifiers
source                  1..7
                        mol_type = protein
                        note = LCDR2 of second single chain Fv of bispecific
                          antibody targeting          CD3 and BCMA
                        organism = synthetic construct
SEQUENCE: 15
GTNKRAP                                                                     7

SEQ ID NO: 16           moltype = AA   length = 9
FEATURE                 Location/Qualifiers
source                  1..9
                        mol_type = protein
                        note = LCDR3 of second single chain Fv of bispecific
                          antibody targeting          CD3 and BCMA
                        organism = synthetic construct
SEQUENCE: 16
ALWYSNLWV                                                                   9

SEQ ID NO: 17           moltype = AA   length = 125
FEATURE                 Location/Qualifiers
source                  1..125
                        mol_type = protein
                        note = VH domain of second single chain Fv of bispecific
                          antibody           targeting CD3 and BCMA
                        organism = synthetic construct
SEQUENCE: 17
EVQLLESGGG LVQPGGSLKL SCAASGFTFN TYAMNWVRQA PGKGLEWVAR IRSKYNNYAT           60
YYADSVKDRF TISRDDSKNT AYLQMNNLKT EDTAVYYCVR HGNFGNSYVS WFAYWGQGTL          120
VTVSS                                                                     125

SEQ ID NO: 18           moltype = AA   length = 109
FEATURE                 Location/Qualifiers
source                  1..109
                        mol_type = protein
                        note = VL domain of second single chain Fv of bispecific
                          antibody           targeting CD3 and BCMA
                        organism = synthetic construct
SEQUENCE: 18
```

```
ELVVTQEPSL TVSPGGTVTL TCRSSTGAVT TSNYANWVQQ KPGQAPRGLI GGTNKRAPGT    60
PARFSGSLLG GKAALTLSGV QPEDEAEYYC ALWYSNLWVF GGGTKLTVL              109

SEQ ID NO: 19            moltype = AA  length = 226
FEATURE                  Location/Qualifiers
source                   1..226
                         mol_type = protein
                         note = Fc fragment
                         organism = synthetic construct
SEQUENCE: 19
DKTHTCPPCP APEAAGGPSV FLFPPKPKDQ LMISRTPEVT CVVVDVSHED PEVKFNWYVD    60
GVEVHNAKTK PREEQYASTY RVVSVLTVLH QDWLNGKEYK CKVSNKALPA SIEKTISKAK   120
GQPREPQVYT LPPSRDELTK NQVSLTCLVK GFYPSDIAVE WESNGQPENN YKTTPPVLDS   180
DGSFFLYSKL TVDKSRWQQG NVFSCSVLHE ALHNHYTQKS LSLSPG                 226

SEQ ID NO: 20            moltype = AA  length = 764
FEATURE                  Location/Qualifiers
source                   1..764
                         mol_type = protein
                         note = amino acid sequence of bispecific antibody, which
                              binds to human         BCMA and CD3
                         organism = synthetic construct
SEQUENCE: 20
MRSLGALLLL LSACLAVSAQ VQLVQSGAEV KKPGSSVKVS CKASGGTFSN YWMHWVRQAP    60
GQGLEWMGAT YRGHSDTYYN QKFKGRVTIT ADKSTSTAYM ELSSLRSEDT AVYYCARGAI   120
YDGYDVLDNW GQGTLVTVSS GGGGSGGGGS GGGGSDIQMT QSPSSLSASV GDRVTITCSA   180
SQDISNYLNW YQQKPGKAPK LLIYYTSNLH SGVPSRFSGS GSGTDFTLTI SSLQPEDFAT   240
YYCQQYRKLP WTFGQGTKLE IKGGGGGSGS GGGSGGGGSS SSSKAPPPSE VQLLESGGGL   300
VQPGGSLKLS CAASGFTFNT YAMNWVRQAP GKGLEWVARI RSKYNNYATY YADSVKDRFT   360
ISRDDSKNTA YLQMNNLKTE DTAVYYCVRH GNFGNSYVSW FAYWGQGTLV TVSSGGGGSG   420
GGGSGGGGSE LVVTQEPSLT VSPGGTVTLT CRSSTGAVTT SNYANWVQQK PGQAPRGLIG   480
GTNKRAPGTP ARFSGSLLGG KAALTLSGVQ PEDEAEYYCA LWYSNLWVFG GGTKLTVLDK   540
THTCPPCPAP EAAGGPSVFL FPPKPKDQLM ISRTPEVTCV VVDVSHEDPE VKFNWYVDGV   600
EVHNAKTKPR EEQYASTYRV VSVLTVLHQD WLNGKEYKCK VSNKALPASI EKTISKAKGQ   660
PREPQVYTLP PSRDELTKNQ VSLTCLVKGF YPSDIAVEWE SNGQPENNYK TTPPVLDSDG   720
SFFLYSKLTV DKSRWQQGNV FSCSVLHEAL HNHYTQKSLS LSPG                   764

SEQ ID NO: 21            moltype = DNA  length = 2313
FEATURE                  Location/Qualifiers
source                   1..2313
                         mol_type = other DNA
                         note = DNA sequence of bispecific antibody, which binds to
                              human BCMA         and CD3
                         organism = synthetic construct
SEQUENCE: 21
actagtcgcc accatgagga gcctcggggc cctgctcttg ctgctgagcg cctgcctggc    60
ggtgagcgct caggtgcagc tggtgcagtc tggcgctgga gtgaagaagc ccggcagctc   120
tgtgaaggtg tcttgtaagg cctccggcgg caccttctcc aactattgga tgcattgggt   180
gcgccaggct cctggccagg gcctggagtg gatgggagct acctacaggg gacactccga   240
cacatattac aatcagaagt ttaagggcag ggtgacaatc accgctgata gtctacatc    300
caccgcctac atggagctgt ccagcctgcg gagcgaggac accgccgtgt attactgcgc   360
cagaggcgct atctacgatg gctatgacgt gctggataac tggggccagg gcacactggt   420
gaccgtgtct tccggaggag gaggatctgg aggaggaggc tccggaggag gaggaagcga   480
tatccagatg acccagagcc caagctctct gtccgcctct gtgggcgata gggtgacaat   540
cacctgttcc gccagccagg acatctctaa ctacctgaat tggtatcagc agaagcccgg   600
caaggctcct aagctgctga tctattacac cagcaatctg cattctggag tgccttcccg   660
cttctctggc tccggaagcg gaacagactt tacactgacc atctccagcc tgcagccaga   720
ggatttcgcc acttactact gccagcagta caggaagctg ccctggacct ttggccaggg   780
taccaagctg gagatcaagg gtggcggcgg tggaggatcc ggcggtggag gtagcggcgg   840
aggcggtagc tccagtctca gtaaagctcc cctccttcc gagtgtcagc tgctggagtc   900
cggaggagga ctggtgcagc caggaggctc cctgaagctg agctgtgctg cctctgcttt  960
taccttcaac acatatgcca tgaattgggt gcggcaggct ccaggcaagg gactggagtg  1020
ggtggctagg atcaggtcta agtacaacaa ttatgccacc tactatgctg attccgtgaa  1080
ggacaggttc accatctccc gcgacgatag caagaacacc gcctacctgc agatgaacaa  1140
tctgaagacc gaggataccg ccgtgtacta ctgcgtgaga catggcaact tggcaatag   1200
ctacgtgtcc tggttcgctt actgggcaca gggcaccctg gtcacagtga gctctggagg  1260
aggaggatct ggaggaggag gctccggagg aggaggaagc gagctggtgg tgacccagga  1320
gccatctctg acagtgtccc ccggcggcac agtgaccctg acatgtagat ccagcaccgg  1380
cgccgtgacc acatccaact acgctaattg ggtgcagcag aagccaggac aggctccaag  1440
gggactgatc ggaggaacca acaagagggc tcctggaaca ccagctcggt ttagcggatc  1500
tctgctggga ggcaaggctg ccctgaccct gtccggagtg cagccagagg atgaggccga  1560
gtattattgc gctctgtggt atagcaatct gtgggtgttc ggaggaggaa ccaagctgac  1620
agtgctggac aagacccata catgcccacc atgccctgcc cctgaagccg ccggaggacc  1680
ttccgttc tcttccctc caagccaaa agatcagctg atgatctcta gaacccccga    1740
agtcacctgc gtggtcgtcg acgtgtccca tgaggaccct gaagtcaagt tcaactggta  1800
cgtggacggt gtcgaagtcc acaacgccaa gaccaagcct agggaggagc agtatgccag  1860
cacataccgg gtggtgtctg tgctgaccgt gctgcatcag gattggctga atggcaagga  1920
atataaatgt aaggtgagca ataaggctct gccggctagc attgaaaaaa ccatttcaa   1980
ggctaagggc cagcccaggg agcctcaggt ctacaccctg cctccatcta gagatgaact  2040
```

```
gaccaaaaac caggtgagcc tgacttgcct ggtcaaaggc ttctacccca gcgacattgc  2100
cgtggagtgg gagtctaatg gccagcctga aaataactac aaaactaccc ctcctgtgct  2160
ggactctgat ggctccttct ttctgtactc taaactgacc gtggacaagt ctcgctggca  2220
gcagggtaac gtgttttctt gctccgtgct gcacgaggct ctgcataacc attacaccca  2280
gaagagcctg tctctgtccc caggatagaa ttc                               2313

SEQ ID NO: 22           moltype = AA   length = 5
FEATURE                 Location/Qualifiers
source                  1..5
                        mol_type = protein
                        note = linker sequence
                        organism = synthetic construct
SEQUENCE: 22
GGGGS                                                                5

SEQ ID NO: 23           moltype = AA   length = 5
FEATURE                 Location/Qualifiers
SITE                    5
                        note = MISC_FEATURE - X = Ser or Ala
source                  1..5
                        mol_type = protein
                        note = linker sequence
                        organism = synthetic construct
SEQUENCE: 23
GGGGX                                                                5

SEQ ID NO: 24           moltype = AA   length = 10
FEATURE                 Location/Qualifiers
source                  1..10
                        mol_type = protein
                        note = CPT1
                        organism = synthetic construct
SEQUENCE: 24
SSSSKAPPPS                                                          10

SEQ ID NO: 25           moltype = AA   length = 14
FEATURE                 Location/Qualifiers
source                  1..14
                        mol_type = protein
                        note = CPT2
                        organism = synthetic construct
SEQUENCE: 25
SRLPGPSDTP ILPQ                                                     14

SEQ ID NO: 26           moltype = AA   length = 16
FEATURE                 Location/Qualifiers
source                  1..16
                        mol_type = protein
                        note = CPT3
                        organism = synthetic construct
SEQUENCE: 26
SSSSKAPPPS LPSPSR                                                   16

SEQ ID NO: 27           moltype = AA   length = 28
FEATURE                 Location/Qualifiers
source                  1..28
                        mol_type = protein
                        note = CPT4
                        organism = synthetic construct
SEQUENCE: 27
SSSSKAPPPS LPSPSRLPGP SDTPILPQ                                      28

SEQ ID NO: 28           moltype = AA   length = 5
FEATURE                 Location/Qualifiers
source                  1..5
                        mol_type = protein
                        note = linker sequence
                        organism = synthetic construct
SEQUENCE: 28
GGGGA                                                                5
```

```
SEQ ID NO: 29         moltype = AA  length = 17
FEATURE               Location/Qualifiers
source                1..17
                      mol_type = protein
                      note = flexible peptide
                      organism = synthetic construct
SEQUENCE: 29
GGGGGGSGGG GSGGGGS                                                        17
```

METHOD OF TREATMENT USING A BISPECIFIC ANTIBODY BINDING BCMA AND CD3

CROSS-REFERENCE TO RELATED APPLICATIONS

This is a continuation application of U.S. patent application Ser. No. 17/290,401, filed on Apr. 30, 2021, which is a U.S. national stage filing, under 35 U.S.C. § 371(c), of International Application No. PCT/CN2019/108057, filed on Sep. 26, 2019, which claims priority to Chinese Patent Application No. 201811294887.4, filed on Nov. 1, 2018, the entire contents of each of which are incorporated herein by reference.

SEQUENCE LISTING

The application contains a Sequence Listing XML file, which has been submitted electronically in .XML format and is hereby incorporated by reference in its entirety. Said XML file, created on May 9, 2024, is named "IEC210116USD_Sequence Listing_updated.xml" and is 36,563 bytes in size. The sequence listing contained in this .XML file is part of the specification and is hereby incorporated by reference herein in its entirety.

FIELD OF TECHNOLOGY

The present invention relates to the field of immunology, particularly to an anti-CD3 bispecific antibody which mediates the killing of T cells and to use of the antibody, particularly the use in treating cancer.

BACKGROUND

Multiple myeloma is a second most common hematological malignant tumor, the uncontrolled proliferation of monoclonal plasma cells in bone marrow leads to the overproduction of monoclonal immunoglobulin and immunosuppression, as well as osteolysis and terminal organ injury. There are currently two monoclonal antibodies have been endorsed for clinical use, and multiple myeloma treatment regimens have significantly improved the survival rate of patients over the past decade. Despite this, the existing treatment regimens still fail to meet the current treatment needs, especially for relapsed/refractory patients who are resistant to the current treatment.

B cell maturation antigen (BCMA) is a highly plasma cell specific antigen that plays an important role in regulating the maturation and differentiation of B cells into plasma cells by participating in proliferation-inducing ligand (APRI). BCMA expression is limited to B cell lineage and mainly exists on plasma cells and plasmablasts, and to a certain extent exists on memory B cells, but does not exist on peripheral and juvenile B-cells essentially, having not been expressed in other normal tissue cells. BCMA is also expressed on multiple myeloma cells and is participated in leukemia and lymphoma. Together with its family members TACI (transmembrane activator and cyclophilin receptor ligand interactor) and BAFF-R (B cell activating factor receptor), BCMA regulates different aspects of humoral immunity, B cell development, and homeostasis. The expression of BCMA appears in the later stage of B-cell differentiation and is beneficial to the long-term survival of plasmablasts and plasma cells in bone marrow. The target deletion of the BCMA gene in mice resulted in a significant reduction in the number of long-lived plasma cells in the bone marrow, indicating that BCMA is important for its survival. BCMA overexpression or stimulation of APRIL by BCMA in multiple myeloma cells directly upregulates key immune checkpoint molecules, which may contribute to immunosuppression of the bone marrow microenvironment.

T lymphocytes play an important role in the process of cellular immunity. The cellular immunity mediated by T cells specifically recognizes antigenic peptides presented by major histocompatibility complex (MHC) on the cell surface primarily through the T cell receptor (TCR). It plays an important role in eliminating diseased cells in vivo and preventing the occurrence of tumors. Because of the expression of MHC on the surface of most cancer cells is down-regulated or even deleted, enabling tumor cells to escape immune killing, thereby develop tumors.

T cell-engaging bispecific antibodies (TCBs) represents a very effective way to redirect activated cytotoxic T cells to tumors. As a part of the T cell receptor, CD3 expressed in mature T cells, can transduce the activation signal generated by TCR recognition antigen. TCBs are capable of binding to surface tumor antigen and CD3 ε subunit of T cell receptor simultaneously, providing a physical connection between T cells and tumor cells, thus effectively activating quiescent T cells to kill tumor cells, achieving the effect of treating tumors dormant (Smits N C, Sentman C L, Journal of Clinical Oncology, 2016: JCO649970). Because of T cell bispecific bypass the co-stimulation requirements of TCR antigen recognition and T cell activation, they eliminate the need for tumor-specific immunity and overcome many obstacles faced by T cells in tumor microenvironment.

In recent years, in order to solve the problem of correctly assembling two different semi-antibodies, scientists have designed and developed bispecific antibodies with a variety of structures. In general, there are two categories, one kind of bispecific antibody does not comprise Fc region, comprising BiTE, DART, TrandAbs, bi-Nanobody, etc. The advantage of this kind of structural double antibody is small molecular weight, can be expressed in prokaryotic cells without considering the problem of correct assembly; The disadvantages is that there is no antibody Fc segment, molecular weight is low, leading to a short half-life. Moreover, this form of double antibody is easy to polymerize, has poor stability and low expression, so its clinical application is limited to some extent. Another kind of bispecific antibodies retains the Fc domain, e.g., the configuration of Triomabs, kih IgG, Cross-mab, orthoFab IgG, DVD IgG, IgG scFv, scFv2-Fc, etc. This kind of double antibody forms IgG-like structure with large molecular structure, and the process of endocytosis and recirculation mediated by FcRn gives it a longer half-life; While retaining some or all effector functions mediated by Fc, such as antibody-dependent cell-mediated cytotoxicity (ADCC), complement-dependent cytotoxicity (CDC) and antibody-dependent phagocytosis (ADCP). However, this kind of double antibody can not completely eradicate the generation of mismatched products, while the residual fractions of any mismatched molecules are difficult to separate from the products, and this method requires a large EU numbering of genetic engineering modifications, such as mutations, against the two antibody sequences, which cannot achieve the purpose of simplicity and universality.

Therefore, the present invention intends to develop a BCMA bispecific molecule with improved performance in terms of product half-life, stability, safety and productivity.

SUMMARY

The purpose of the present invention is to provide a tetravalent homodimeric bispecific antibody molecule targeting immune effector cell antigen CD3 and tumor antigen BCMA. Such bispecific antibody can significantly inhibit or kill tumor cells in vivo, but its nonspecific killing effect on normal cells with low expression of BCMA is significantly reduced, meanwhile, the controllability of toxic and side effects caused by overactivation of effector cells is increased, and its physicochemical properties and in vivo stability are significantly improved.

In particularly, the first aspect of the present invention discloses a bispecific antibody, which is composed of two identical polypeptide chains bonded covalently to form a tetravalent homodimer, wherein each of the polypeptide chains sequentially comprises a first single-chain Fv specifically binding to a tumor antigen BCMAeach polypeptide chain from N end to C end, a second single-chain Fv specifically binding to an effecter cell antigen CD3, and an Fc fragment; wherein the first single-chain Fv and the second single-chain Fv are connected by a linker peptide, and the second single-chain Fv and the Fc fragment are connected directly or by a linker peptide, and the Fc fragment does not have effector functions such as CDC, ADCC and ADCP.

Wherein, the first single-chain Fv comprises a VH domain and a VL domain connected by a linker peptide, and amino acid sequence of the linker peptide is (GGGGX (SEQ ID NO: 23))$_n$, wherein X is Ser or Ala, n is a natural number from 1 to 5; preferably X is Ser, preferably n is 3.

In a preferred embodiment of the present invention, an amino acid sequence of the linker peptide L1 is (GGGGS (SEQ ID NO: 22))$_3$, and in other preferred embodiments, the amino acid sequence of the linker peptide L1 further comprises (GGGGS (SEQ ID NO: 22))$_1$ or (GGGGS (SEQ ID NO: 22))$_2$ or (GGGGS (SEQ ID NO: 22))$_4$ or (GGGGS (SEQ ID NO: 22))$_5$ or (GGGGA (SEQ ID NO: 28))$_1$ or (GGGGA (SEQ ID NO: 28))$_2$ or (GGGGA (SEQ ID NO: 28))$_3$ or (GGGGA (SEQ ID NO: 28))$_4$ or (GGGGA (SEQ ID NO: 28))$_5$.

Preferably, the first single chain Fv comprises:
(1) a VH domain, comprising HCDR1, HCDR2 and HCDR3 having a sequence as shown in SEQ ID NO: 1, 2 and 3 respectively, or comprising HCDR1, HCDR2 and HCDR3 having a sequence at least 80%, 85%, 90%, 92%, 95%, 97%, 98%, 99% or higher identity to SEQ ID NO: 1, 2 and 3 respectively, or comprising HCDR1, HCDR2 and HCDR3 having a sequence as shown in SEQ ID NO: 1, 2 and 3 respectively except for one or more amino acid substitutions (for example conservative substitutions); and
(2) a VL domain, comprising LCDR1, LCDR2 and LCDR3 having a sequence as shown in SEQ ID NO: 4, 5 and 6, respectively, or comprising LCDR1, LCDR2 and LCDR3 having a sequence at least 80%, 85%, 90%, 92%, 95%, 97%, 98%, 99% or higher identity to SEQ ID NO: 4, 5 and 6 respectively, or comprising LCDR1, LCDR2 and LCDR3 having a sequence as shown in SEQ ID NO: 4, 5 and 6 respectively except for one or more amino acid substitutions (for example conservative substitutions).

More preferably, the first single chain Fv comprises:
(1) a VH domain having an amino acid sequence as shown in SEQ ID NO: 7, or having a sequence at least 80%, 85%, 90%, 92%, 95%, 97%, 98%, 99% or higher identity to SEQ ID NO: 7, or having a sequence as shown in SEQ ID NO: 7 except for one or more amino acid substitutions (for example conservative substitutions); and (2) a VL domain having an Amino acid sequences as shown in SEQ ID NO: 8, or having a sequence at least 80%, 85%, 90%, 92%, 95%, 97%, 98%, 99% or higher identity to SEQ ID NO: 8, or having a sequence as shown in SEQ ID NO: 8 except for one or more amino acid substitutions (for example conservative substitutions). Wherein, the linker peptide L2 connecting the first single chain Fv and the second single chain Fv of the present invention composes of a flexible peptide and a rigid peptide.

Further, the flexible peptide comprises two or more amino acids, and is preferably selected from the following amino acids: Gly(G), Ser(S), Ala(A) and Thr(T). More preferably, the flexible peptide comprises G residues and S residues. Most preferably, the general structural formula of amino acid composition of the flexible peptide is GxSy(GGGGS (SEQ ID NO: 22))z, wherein x, y and z are integers greater than or equal to 0, and x+y+z is ≥1. For example, in a preferred embodiment, an amino acid sequence of the flexible peptide is G2(GGGGS)$_3$ (SEQ ID NO: 29).

Further, the rigid peptide is a full-length sequence consisting of amino acids at positions 118 to 145 derived from the carboxyl terminal of natural human chorionic gonadotropin beta subunit (as shown in SEQ ID NO: 9) or a truncated fragment thereof (hereinafter collectively referred to as CTP). preferably, CTP1 rigid peptide comprises 10 amino acids at the N-end of SEQ ID NO: 9, namely SSSSKAPPPS (SEQ ID NO: 24); or CTP2rigid peptide comprises 14 amino acids at the C end of SEQ ID NO: 9, namely SRLPGPSDTPILPQ (SEQ ID NO: 25); CTP3 rigid peptide comprises 16 amino acids at the N end of SEQ ID NO: 9, namely SSSSKAPPPSLPSPSR (SEQ ID NO: 26); CTP4 rigid peptide comprises 28 amino acids and starts at position 118 of human chorionic gonadotropin ß subunit and ends at position 145, namely SSSSKAPPPSLPSPSRLPGPSDTPILPQ (SEQ ID NO: 27).

In a preferred embodiment of the present invention, the rigid peptide is SSSSKAPPPS (SEQ ID NO: 24), namely, CTP1 rigid peptide. In other preferred implementations, the rigid peptide sequence further comprises CTP2 (SRLPGPSDTPILPQ (SEQ ID NO: 25)), CTP3 (SSSSKAPPPSLPSPSR (SEQ ID NO: 26)), CTP4 (SSSSKAPPPSLPSPSRLPGPSDTPILPQ (SEQ ID NO: 27)).

In a preferred embodiment of the present invention, an amino acid sequence of the linker peptide L2 is shown in SEQ ID NO: 10, the amino acid of its flexible peptide composed of G2(GGGGS)3 (SEQ ID NO: 29), and the amino acid of its rigid peptide composed of SSSSKAPPPS (SEQ ID NO: 24), namely, CTP1 rigid peptide.

Wherein, the second single chain Fv of bispecific antibody specifically binds to CD3 and binds to effector cells with an $EC_{50}$ value greater than 50 nM, or greater than 100 nM, or greater than 300 nM, or greater than 500 nM in vitro FACS binding analysis; more preferably, the second single chain Fv of the bispecific antibody can not only bind to human CD3, but also specifically bind to CD3 of a cynomolgus monkey or a rhesus monkey. In a preferred embodiment of the present invention, the bispecific antibody specifically binds to effector cells with an $EC_{50}$ value of 132.3 nM.

Preferably, the second single chain Fv comprises:
(1) a VH domain, comprising HCDR1, HCDR2 and HCDR3 having a sequence as shown in SEQ ID NO: 11, 12 and 13 respectively, or comprising HCDR1, HCDR2 and HCDR3 having a sequence at least 80%, 85%, 90%, 92%, 95%, 97%, 98%, 99%or higher identity to SEQ ID NO: 11, 12 and 13 respectively, or comprising HCDR1, HCDR2 and HCDR3 having a sequence as shown in SEQ ID NO: 11, 12 and 13 respectively except for one or more amino acid substitutions (for example conservative substitutions); and (2) a VL domain, comprising LCDR1, LCDR2 and LCDR3 having a sequence as shown in SEQ ID NO: 14, 15 and 16, respectively, or comprising LCDR1, LCDR2 and LCDR3 having a sequence at least 80%, 85%, 90%, 92%, 95%, 97%, 98%, 99%or higher identity to SEQ ID NO: 14, 15 and 16 respectively, or comprising LCDR1, LCDR2 and LCDR3 having a sequence as shown in SEQ ID NO: 14, 15 and 16 respectively except for one or more amino acid substitutions (for example conservative substitutions).

More preferably, the second single-chain Fv comprises a VH domain, having an amino acid sequence as shown in SEQ ID NO: 17 or a sequence at least 80%, 85%, 90%, 92%, 95%, 97%, 98%, 99% or higher identity to SEQ ID NO: 17 or having a sequence as shown in SEQ ID NO: 17 except for one or more amino acid substitutions (for example conservative substitutions); and A VL domain, having an amino acid sequence as shown in SEQ ID NO: 18 or having a sequence at least 80%, 85%, 90%, 92%, 95%, 97%, 98%, 99%or higher identity to SEQ ID NO: 18 or having a sequence as shown in SEQ ID NO: 18 except for one or more amino acid substitutions (for example conservative substitutions).

Preferably, the VH domain and VL domain of the second single-chain Fv are connected by a linker peptide L3, and the VH, L3 and VL are arranged in the order of VH-L3-VL or VL-L3-VH, and amino acid sequence of the linker peptide L3 is (GGGGX (SEQ ID NO: 23))n, wherein, x is selected from Ser or Ala, and n is a natural number from 1-5; preferably X is Ser, preferably n is 3.

In a preferred embodiment of the present invention, an amino acid sequence of the linker peptide L3 is (GGGGS (SEQ ID NO: 22))$_3$, in other preferred embodiments, an amino acid sequence of the linker peptide L3 further comprises (GGGGS (SEQ ID NO: 22))$_1$ or (GGGGS (SEQ ID NO: 22))$_2$ or (GGGGS (SEQ ID NO: 22))$_4$ or (GGGGS (SEQ ID NO: 22))$_5$ or (GGGGA (SEQ ID NO: 28))$_1$ or (GGGGA (SEQ ID NO: 28))$_2$ or (GGGGA (SEQ ID NO: 28))$_3$ or (GGGGA (SEQ ID NO: 28))$_4$ or (GGGGA (SEQ ID NO: 28))$_5$.

Wherein, the Fc fragment of the present invention is connected with the second single-chain Fv directly or through a linker peptide L4, and the linker peptide L4 comprises 1-20 amino acids, and is preferably selected from the following amino acids: Gly(G), Ser(S), Ala(A) and Thr(T); more preferably, the linker peptide L4 is selected from Gly(G) and Ser(S); more preferably, the linker peptide L4 is composed of (GGGGS (SEQ ID NO: 22))$_n$, and n=1, 2, 3 or 4. In a preferred embodiment of the present invention, the Fc fragment is directly connected to the second single chain Fv. In another prefer embodiment, that Fc fragment is connected with the second single chain Fv through a linker peptide L4, and the amino acid sequence of the connected peptide L4 comprises (GGGGS (SEQ ID NO: 22))$_1$ or (GGGGS (SEQ ID NO: 22))$_2$ or (GGGGS (SEQ ID NO: 22))$_3$ or (GGGGS (SEQ ID NO: 22))$_4$.

The Fc fragment of the present invention comprises hinge region, CH2 and CH3 domain derived from a human immunoglobulin heavy chain constant region, for example, in some implementations, the Fc fragment of the present invention is derived from heavy chain constant region selected from human IgG1, IgG2, IgG3, IgG4, IgM, IgA1, IgA2, IgD and IgE; particularly selected from heavy chain constant regions for example human IgG1, IgG2, IgG3 and IgG4, more particularly selected from heavy chain constant regions of human IgG1 or IgG4; and, the Fc fragment has one or more amino acid substitutions, deletions or additions (for example, at most 20, at most 15, at most 10, or at most 5 substitutions, deletions or additions) compared with an original natural sequence thereof.

The Fc fragment has an amino acid sequence as shown in SEQ ID NO: 19, and compared with an original natural sequence of the Fc fragment, of the Fc fragment has the following 6 amino acid replacements or substitutions determined according to the EU numbering system: L234A/L235A/N297A/P331S/T250Q/M428L; and K447 determined according to EU numbering system is deleted or deleted. The EU numbering system comes from the website: http://www.imgt.org/imgtscientific chart/numbering/Hu-_iggnbcr.htm.

In some preferred Implementations, the Fc fragment is altered, e.g., mutated, to modify the properties of the bispecific antibody molecule of the present invention (e.g., change one or more of the following characteristics: Fc receptor binding, antibody glycosylation, effector cell function or complement function).

For example, the bispecific antibody provided by the present invention comprises Fc variants with amino acid substitutions, deletions, or additions with altered effector functions (e.g., reduction or elimination). The Fc region of antibody mediates several important effector functions, for example ADCC, ADCP, CDC, etc. The method of changing effector functions by replacing amino acid residues in the Fc region of antibody to change the affinity of antibody to effector ligand (such as FcγR or complement C1q) is known in the art (see, for example, EP 388, 151A1; U.S. Pat. No. 564,8260; U.S. Pat. No. 562,4821; Natsume A et al., Cancer Res., 68: 3863-3872, 2008; Idusogie E E et al., J. Immunol., 166: 2571-2575, 2001; Lazar G A et al., PNAS, 103: 4005-4010, 2006; Shields R L et al., J B C, 276: 6591-6604, 2001; Stavenhagen J B et al., Cancer Res., 67: 8882-8890, 2007; Stavenhagen J B et al., Advan. Enzyme. Regul., 48: 152-164, 2008; Alegre M L et al., J. Immunol., 148: 3461-3468, 1992; and Kaneko E et al., Biodrugs, 25: 1-11, 2011). In some preferred embodiments of the present invention, the amino acid L235 (EU numbering) in the antibody constant region is modified to change the Fc receptor interaction, for example L235E or L235A. In another preferred embodiments, amino acids 234 and 235 in the antibody constant region are modified at the same time, such as L234A and L235A (L234A/L235A) (EU numbering).

For example, the bispecific antibody provided by the present invention can comprise Fc variants with amino acid substitution, deletion, or addition with prolonged circulating half-life. M252Y/S254T/T256E, M428L/N434S or T250Q/M428L can prolong the half-life of antibody in primates. See Chinese invention patents CN 201280066663.2, US 2005/0014934A1, WO 97/43316, U.S. Pat. Nos. 5,869,046, 5,747, 03 and WO 96/32478 for more mutation sites comprised in Fc variants with enhanced binding affinity to neonatal receptor (FcRn). In some preferred embodiments of the present invention, amino acid M428 (EU numbering) in the antibody constant region is modified to enhance the binding affinity of FcRn receptor, for example M428L. In another preferred embodiments, amino acids 250 and 428(EU numbering) in the antibody constant region are modified at the same time, for example T250Q and M428L(T250Q/M428L).

For example, the bispecific antibody provided by the present invention can further comprise Fc variants with amino acid substitutions, deletions, or additions that can reduce or eliminate Fc glycosylation. For example, Fc variants comprise reduced glycosylation of N-linked glycans normally present at amino acid position 297 (EU numbering). Glycosylation at N297 has great influence on the activity of IgG. if glycosylation at N297 is removed, it will affect the conformation of the upper half part of CH2 of IgG molecule, thus losing the binding ability to FcγRs and affecting the biological activity of antibody. In some preferred embodiments of the present invention, amino acid N297 (EU numbering) in the constant region of human IgG is modified to avoid glycosylation of antibody, for example N297A.

For example, the bispecific antibody provided by the present invention can further comprise Fc variants with amino acid substitution, deletion, or addition to eliminate charge heterogeneity. Many post-translational modifications in the expression process of engineering cells will cause charge heterogeneity of monoclonal antibodies, and the heterogeneity of lysine at the C-terminal of IgG antibody is one of the main reasons, lysine K at the C-terminal of heavy chain may be missing in a certain proportion during antibody production, resulting in charge heterogeneity, thus affecting the stability, effectiveness, immunogenicity or pharmacokinetics of antibodies. In some preferred embodiments of the present invention, K447 (EU numbering) at the C-terminal of IgG antibody is removed or deleted, so as to eliminate the charge heterogeneity of the antibody and improve the uniformity of the expression product.

Compared with the bispecific antibody including wild-type human IgG Fc region, the Fc fragment comprised in the bispecific antibody provided by the present invention shows reduced affinity for at least one of human FcγRs (FcγRI, FcγRIIa or FcγRIIIa) and C1q, and has reduced effector cell function or complement function. For example, in a preferred embodiment of the present invention, the Fc fragment comprised in the bispecific antibody is derived from human IgG1, and has L234A and L235A substitutions (L234A/L235A), showing reduced binding ability to FcγRI; in addition, the Fc fragment contained in the bispecific antibody provided by the present invention may further comprise amino acid substitutions that change one or several other characteristics (for example, binding ability with FcRn receptor, antibody glycosylation or antibody charge heterogeneity, etc.). For example, in a preferred embodiment of the present invention, the amino acid sequence of the Fc fragment is shown as SEQ ID NO: 19, which has the amino acid replacement or substitution of L234a/L235a/T250Q/N297a/P331s/M428L compared with an original natural sequence thereof, and K447 is deleted or deleted.

The bispecific antibody molecule of the present invention is formed by combining two identical polypeptide chains through interchain disulfide bonds in hinge regions of Fc fragments to form a tetravalent homodimer, and each polypeptide chain consists of an anti-BCMA scFv, a linker peptide, an anti-CD3 scFv and an Fc fragment in sequence from the N end to the C end.

In a preferred embodiment of the present invention, the bispecific antibody binds to human BCMA and CD3, and its amino acid sequence is as follows:
  (1) sequence shown in SEQ ID NO: 20;
  (2) Compared with the sequence shown in SEQ ID NO: 20, the sequence having one or several substitutions, deletions or additions (for example, one, two, three, four or five substitutions, deletions or additions); or
  (3) sequence having at least 80%, at least 85%, at least 90%, at least 91%, at least 92%, at least 93%, at least 94%, at least 95%, at least 96%, at least 97%, at least 98%, at least 99% or 100% sequence identity to the sequence shown in SEQ ID NO: 20.

In certain preferred implementations, the substitutions described in (2) are conservative substitutions.

In a second aspect of the present invention, there is provided a DNA molecule encoding the foregoing bispecific antibody.

In a preferred embodiment of the present invention, the DNA molecule encoding the foregoing bispecific antibody has a nucleotide sequence shown in SEQ ID NO: 21.

In a third aspect of the present invention, there is provided a vector comprising the foregoing DNA molecule.

According to a fourth aspect of the present invention, there is provided a host cell comprising the foregoing vector; the host cell comprise a prokaryotic cell, a yeast cell or a mammalian cell, preferably said host cell is a mammalian cell, such as a CHO cell, a NSO cell or a other mammalian cell, more preferably a CHO cell.

According to a fifth aspect of the present invention, there is provided a pharmaceutical composition comprising the foregoing bispecific antibody and a pharmaceutically acceptable excipient and/or vector and/or diluent.

In a sixth aspect of the present invention, there is also provided a method for preparing the bispecific antibody of the present invention, comprises:
  (a) obtaining fusion gene of bispecific antibody, construct the expression vector of bispecific antibody;
  (b) transfecting the foregoing expression vector into a host cell by a genetic engineering method;
  (c) culturing the foregoing host cell under conditions that allow the production of the bispecific antibody;
  (d) Separating and purifying the produced antibody.

Wherein, the expression vector in step (a) is selected from one or more of plasmids, bacteria and viruses, preferably, the expression vector is a plasmid, more preferably, the expression vector is PCDNA3.1;

Wherein, in the step (b), the constructed vector is transfected into a host cell by a genetic engineering method, the host cell comprises a prokaryotic cell, a yeast cell or a mammalian cell, preferably, the host cell is a mammalian cell such as a CHO cell, a NSO cell or a other mammalian cell, more preferably a CHO cell.

Wherein, in step (d), the bispecific antibody is separated and purified by conventional immunoglobulin purification methods including protein A affinity chromatography and ion exchange, hydrophobic chromatography, or molecular sieve method.

The seventh aspect of the present invention, providing the use of the bispecific antibody in the manufacture of a medicament for treating or improving a plasma cell disorder, an other B cell disorder associated with BCMA expression, or an autoimmune disease, wherein the plasma cell disorder includes but is not limited to multiple myeloma, plasmacytoma, plasma cell leukemia, macroglobulinaemia, amyloidosis, Waldenstrom's macroglobulinaemia, solitary bone plasmacytoma, extramedullary plasmacytoma, osteosclerotic myeloma, heavy chain disease, monoclonal gammopathy of undetermined significance and smoldering multiple myeloma.

According to the technical scheme disclosed by the present invention, beneficial technical effects are achieved:
  1, the bispecific antibody provided by the present invention is not easy to bind to normal cells with weak or low expression of BCMA, which reduces nonspecific killing, but the binding specificity to cells with overexpression or high expression of BCMA does not decrease significantly, showing a good killing effect in vivo. This is also known, it is known that when the target antigen is only expressed on tumor cells or the bispecific antibody of the present invention is only specifically combined with tumor cells overexpressing the target antigen, the immune effector cells are only activated in the target cell tissues, which makes the nonspecific killing of normal cells and the accompanying release of cytokines by the bispecific antibody be minimized, thus reducing its toxic and side effects in clinical treatment.

2, the anti-CD3 scFv selected by the bispecific antibody provided by the present invention specifically binds to effector cells with weak binding affinity ($EC_{50}$ value is greater than 50 nM, or greater than 100 nM, or greater than 300 nM, or greater than 500 nM). in addition, the CTP rigid peptide comprised in the linker peptide L3 embedded between the anti-BCMA scFv and Fc and located at its n terminal and the Fc fragment located at its c terminal, they all partially "cover" or "shield" the antigen binding domain of anti-CD3 scFv, and this steric effect makes it bind to CD3 with weaker binding affinity (for example, more than 1 μM), which weakens its ability to stimulate the activation of t cells, thus limiting the excessive release of cytokines, thus having higher safety.

3, the bispecific antibody provided by the present invention creatively adopts bivalent anti-CD3 scFv, which makes the bispecific antibody avoid the asymmetric structure of heterodimer type (the comprised anti-CD3 scFv is monovalent) generally adopted in the prior art in configuration design, so that the problem of mismatch between heavy chains does not exist, and the downstream purification steps are simplified; and unexpectedly, the nonspecific binding of anti-CD3 scFv to T cells was not observed in the in vitro cell binding test, and the degree of cell activation (release of cytokines such as IL-2) was controlled within a safe and effective range, that is, the bivalent anti-CD3 scFv structure adopted in the present invention did not cause overactivation of t cells independently of antigen, but for other bispecific antibodies containing bivalent anti-CD3 domain, T cells were uncontrollable.

4, the modified Fc fragment comprised in the bispecific antibody provided by the present invention does not have the ability of FcγR binding, which avoids the systemic activation of T cells mediated by FcγR, thus allowing immune effector cells to be activated only in target cell tissues.

5, the bispecific antibody provided by the present invention is homodimeric, does not have the problem of mismatch between heavy chain and light chain, and has stable downstream production process, simple and efficient purification steps, uniform expression products, and obviously improved physicochemical and in vivo stability.

DETAILED DESCRIPTION OF THE INVENTION

ABBREVIATIONS AND DEFINITIONS

BCMA B cell maturation antigen
BiAb bispecific antibody(bispecific antibody)
CDR Complementarity determining regions in immunoglobulin variable regions defined by a Kabat numbering system
$EC_{50}$ A concentration that produces 50% efficacy or binding
ELISA enzyme-linked immunosorbent assay
FR Antibody framework region: immunoglobulin variable region excluding CDR region
HRP horse radish peroxidase
IL-2 interleukin2
IFN interferon
$IC_{50}$ A concentration that produces a 50% inhibitory
IgG immune globulinG
Kabat Immunoglobulin alignment and numbering system advocated by Elvin A Kabat mAb monoclonal antibody
PCR polymerase chain reaction
V- IgG chain segments with variable sequence between different antibodies It region extends to the 109th Kabat residue of the light chain and the 113th residue of the heavy chain
VH immunoglobulin heavy chain variable region
VK Immunoglobulin k light chain variable region
$K_D$ equilibrium dissociation constant
$k_a$ association rate constant
$k_d$ dissociation rate constant In the present invention, unless indicated otherwise, the scientific and technical terms used herein have the meanings commonly understood by those skilled in the art. The antibodies or fragments thereof used in the present invention can use conventional techniques known in the art individually or in combination (e.g., amino acid deletion, insertion, substitution, addition, and/or recombination and/or other modification methods) to be further modified. The method of introducing such modification into its DNA sequence based on amino acid sequence of an antibody is well known to those skilled in the art; See, for example, Sambrook, molecular cloning: A Laboratory Manual, Cold Spring Harbor Laboratory (1989) N.Y. The modifications referred to are preferably performed at the nucleic acid level. Meanwhile, in order to better understand the present invention, definitions and explanations of related terms are provided below.

"BCMA" is a B cell maturation antigen, belonging to tumor necrosis factor receptor superfamily member, which is preferably expressed in mature B lymphocytes and expressed on the surface of plasmablasts (i.e., plasma cell precursors) and plasma cells. RNA of BCMA can be detected in spleen, lymph node, thymus, adrenal gland and liver, the level of BCMA mRNA in multiple B cell lines also increased after maturation. BCMA is associated with many diseases (leukemia, lymphoma (such as Hodgkin's lymphoma), multiple myeloma, autoimmune diseases (such as systemic lupus erythematosus) and so on, so it can be used as a potential target for related B cell diseases. Indications for BCMA targets further comprises other associated diseases or disorders found in the prior art and found in the future. This term further comprises any variant, isoform, and species homologue of BCMA, which is expressed naturally by cells, comprising tumor cells, or expressed by cells transfected with BCMA gene or cDNA.

CD3 molecules is an important differentiation antigen on T cell membrane, a characteristic marker of mature T cells, composed of six peptide chains, which form TCR-CD3 complex with non-covalent bond and T cell antigen receptor (TCR), it not only participates in the intracytoplasmic assembly of the TCR-CD3 complex, but also transmits antigen stimulation signals through the immune receptor tyrosine-based activation motif (Immunoreceptor Tyrosine-based Activation Motif, ITAM) in the cytoplasmic region of each polypeptide chain. The main functions of CD3 molecule are to stabilize TCR structure, transmit T cell activation signal, when TCR specifically recognizes and binds to antigen, CD3 participates in signal transduction to T cell cytoplasm, which is the first signal to induce T cell activation, playing an extremely important role in T cell antigen recognition and immune response.

"CD3" refers to as a part of T cell receptor complex, which is composed of three different chains: CD3ε, CD3δ and CD3γ. The clustering of CD3 on T cells through for example, the immobilization of anti-CD3 antibodies, leads to the activation of T cells, which is similar to tT cell receptor-mediated activation, but independent of the specificity of TCR clones. Most anti-CD3 antibodies recognize CD3 ε chain. The second functional domain of the present invention specifically recognizing T cell surface receptor CD3 is not particularly limited as long as it can specifically recognize CD3, for example but not limited to CD3 antibodies mentioned in the following patents: U.S. Pat. Nos. 7,994,289, 6,750,325; 6,706,265; 5,968,509; 8,076,459; 7,728,114; U.S. Pat. No. 20100183615. Preferably, the anti-human CD3 antibodies used in the present invention are cross-reactive with cynomolgus monkey and/or rhesus monkeys, for example, but not limited to, the anti-human CD3 antibodies mentioned in the following patents: WO 2016130726, U.S. Pat. No. 20,050,176028, WO 2007042261 or WO 2008119565. This term further comprises any CD3 variants, isoforms, derivatives and species homologues, which is naturally expressed by cells or expressed on cells transfected with genes or cDNA encoding the aforementioned chains.

The term "antibody" specifically comprises monoclonal antibodies, polyclonal antibodies and antibody-like polypeptides, for example chimeric antibodies and humanized antibody. "Antigen binding fragment" comprises fragments provided by any known techniques, for example enzymatic cleavage, peptide synthesis and recombination techniques. Some antigen-binding fragments are composed of intact antibody parts that retain the antigen-binding specificity of the parent antibody molecules. For example, an antigen binding fragment may comprise at least one variable region (heavy chain or light chain variable region) or one or more CDRs of an antibody known to bind a specific antigen. Examples of suitable antigen binding fragments include, but are not limited to, bispecific antibody bodies and single chain molecules as well as Fab, F(ab')2, Fc, Fabc and Fv molecules, single chain (Sc) antibodies, separate antibody light chains, separate antibody heavy chains, chimeric fusions between antibody chains or CDRs and other protein, protein scaffolds, heavy chain monomers or dimers, light chain monomers or dimers, a dimer consisting of one heavy chain and one light chain, a monovalent antibody consisting of the VL, VH, CL, and CHI domains, or as described in WO2007059782, comprises a bivalent fragment of two Fab fragments connected by a disulfide bond on a hinged region, a Fd fragment consisting substantially of VH and CHI domains; Fv fragment, dAb fragment, which is substantially composed of VL and VH domains of the single arm of the antibody (Ward et al., Nature, 1989, 341: 544-54), it substantially consists of VH domain, also called domain antibody (Holt et al., Trends Biotechnology. 2003, 21 (11): 484-90); or nanoparticles (Revets et al.; Expert Opin Biol Ther. 2005 January; 5(1): 111-24); Isolated complementarity determining regions (CDRs), etc. All antibody isotypes can be used to produce antigen binding fragments. Additionally, antigen binding fragments may comprise a non-antibody protein framework, which can successfully incorporate polypeptide fragments into an orientation that confers affinity to a given antigen of interest (for example a protein scaffold). The antigen-binding fragment can be recombinantly produced or produced by enzymatic or chemical cleavage of an intact antibody. The term "antibody or antigen binding fragment thereof" may be used to represent that a given antigen binding fragment is incorporated into one or more amino acid fragments of the antibody mentioned in the phrase.

The term "hypervariable region" or "CDR region" or "complementarity determining region" refers to an antibody amino acid residue responsible for antigen binding, which is a discontinuous amino acid sequence. A CDR region sequence may be defined by the IMGT, Kabat, Chothia and AbM methods or the amino acid residues within the variable region identified by any CDR region sequence determination method well known in the art. For example, the hypervariable region comprises the following amino acid residues: amino acid residues from the "complementarity determining region" or "CDR" defined by sequence alignment, for example, residues 24-34 (L1), 50-56 (L2) and 89-97 (L3) of the light chain variable domain and residues 31-35 (H1), 50-65 (H2) and 95-102 (H3) of the heavy chain variable domain See Kabat et al., 1991, sequences of proteins of immunological interest, 5th edition, Public Health Service, National Institutes of Health, Bethesda, Md.; and/or residues from the "hypervariable ring" (HVL) defined according to structure, for example, residues 26-32 (L1), 50-52 (L2) and 91-96 (L3) of the light chain variable domain and residues 26-32 (H1), 53-55 (H2) and 96-101 (H3) of the heavy chain variable domain, see Chothia and Leskl, J. Mol. Biol., 196: 901-917, 1987. A "framework" residue or "FR" residue is a variable domain residue other than a hypervariable region residue as defined herein. In certain implementations, the CDR contained in the antibody or antigen binding fragment of the present invention is preferably determined by Kabat, Chothia or IMGT numbering system. Those skilled in the art can explicitly confer each system to any variable domain sequence without relying on any experimental data beyond the sequence itself. For example, the numbering of Kabat residues of a given antibody can be determined by comparing the antibody sequence with each "standard" numbering sequence. Based on the sequence numbers provided herein, it is completely within the conventional technical scope of those skilled in the art to determine the numbering scheme of any variable region sequence in the sequence list.

The term "single chain Fv antibody" (or "scFv antibody") refers to an antibody fragment including VH and VL domains of an antibody, which is a recombinant protein of a heavy chain variable region (VH) and a light chain variable region (VL) connected by a linker, the linker makes these two domains cross-link to form an antigen binding site, the linker sequence is generally composed of a flexible peptide, for example but not limited to G2(GGGGS)3 (SEQ ID NO: 29). ScFv is generally ⅙ the size of an intact antibody. The single chain antibody is preferably an amino acid chain sequence encoded by a nucleotide chain. For a review of scFv, see PluckThun (1994) The Pharmacology of Monoclonal Antibodies, Vol. 113, Rosenburg and Moore, Springer-Verlag, New York, pp. 269-315. See also international patent application publication no. WO 88/01649 and U.S. Pat. Nos. 4,946,778 and 5,260,203.

The term "Fab fragment" consists of CHI and variable regions of one light chain and one heavy chain. The heavy chain of Fab molecule cannot form disulfide bond with another heavy chain molecule. The size of "Fab antibody" is ⅓ of that of a intact antibody, it comprises only one antigen binding site.

The term "Fab' fragment" contains VH domain and CH1 domain of one light chain and one heavy chain, and the constant region part between CH1 and CH2 domain.

The term "F(ab')2 fragment" contains VH and CH1 domains of two light chains and two heavy chains, and the constant region part between CH1 and CH2 domains, thereby forming an interchain disulfide bond between the two heavy chains. Therefore, the F(ab')2 fragment consists of two Fab' fragments held together by disulfide bonds between two heavy chains.

The term "Fc" region refers to antibody heavy chain constant region fragment, which comprises at least hinge region, CH2 and CH3 domain.

The term "Fv region" comprises variable regions from both heavy and light chains, but lacks constant regions, is the smallest fragment including intact antigen recognition and binding sites.

The term "Fd fragment" is composed of CHI and variable region of a heavy chain, which is the heavy chain part left after light chain is removed from Fab fragment.

The term "disulfide bond stability protein (dsFv)" introduces one cysteine mutation point in the VH and VL regions respectively, thereby forming a disulfide bond between VH and VL to achieve structural stability.

The term "linker peptide" refers to a peptide connecting two polypeptides, wherein the linker peptide can be two immunoglobulin variable regions or one variable region. The length of the linker peptide may be 0-30 amino acids or 0-40 amino acids. In some implementations, the linker peptide may be 0-25, 0-20, or 0-18 amino acids in length. In some implementations, the linker peptide may be a peptide no more than 14, 13, 12, 11, 10, 9, 8, 7, 6 or 5 amino acids long. In other implementations, the linker peptide may be 0-25, 5-15, 10-20, 15-20, 20-30 or 30-40 amino acids long. In other implementations, the linker peptide may be about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 amino acids long. linker peptides are known to those skilled in the art. The linker peptide may be prepared by any method in the art. For example, the linker peptide may be of synthetic origin.

The term "heavy chain constant region" comprises amino acid sequences derived from immunoglobulin heavy chains. Polypeptides including heavy chain constant regions comprise at least one of CH1 domain, hinge (e.g., upper hinge region, middle hinge region, and/or lower hinge region) domain, CH2 domain, CH3 domain, or variants or fragments thereof. For example, the antigen-binding polypeptide used in the present application can comprise a polypeptide chain with a CH1 domain; polypeptides with CH1 domain, at least a part of hinge domain and CH2 domain; Polypeptide chain with CH1 domain and CH3 domain; a polypeptide chain with CH1 domain, at least a part of hinge domain and CH3 domain, or a polypeptide chain with CH1 domain, at least a part of hinge structure, CH2 domain and CH3 domain. In another embodiment, the polypeptide of the present application comprises a polypeptide chain having a CH3 domain. Additionally, antibodies used in the present application may lack at least a part of the CH2 domain (e.g., all or a part of the CH2 domain). As mentioned foregoing, it should be understood by those of ordinary skill in the art that the heavy chain constant regions may be modified so that they are different from naturally occurring immunoglobulin molecules in amino acid sequence.

The term "light chain constant region" comprises the amino acid sequence from the antibody light chain. Preferably, the light chain constant region comprises at least one of a constant kappa domain and a constant lambda domain.

The term "VH domain" comprises the amino terminal variable domain of immunoglobulin heavy chain, while the term "CH1 domain" comprises the first (mostly amino terminal) constant region of immunoglobulin heavy chain. CH1 domain is adjacent to VH domain and is the amino terminus of hinge region of immunoglobulin heavy chain molecule.

The term "hinge region" comprises that part of the heavy chain molecule that connects the CH1 domain to the CH2 domain. The hinge region contains about 25 residues and is flexible so that the two N-terminal antigen binding regions move independently. The hinge region can be divided into three different domains: upper, middle and lower hinge domains (Roux K H et al., J. Immunol., 161: 4083, 1998).

The term "disulfide bond" comprises a covalent bond formed between two sulfur atoms. Amino acid cysteine contains sulfhydryl group, which can form disulfide bond or bridge with the second sulfhydryl group. In most naturally occurring IgG molecules, CH1 and CK regions are connected by disulfide bonds and two heavy chains are connected by two disulfide bonds at 239 and 242 (position 226 or 229, EU numbering system) corresponding to the Kabat numbering system.

"Binding" defines the affinity interaction between a specific epitope on an antigen and its corresponding antibody, which is generally understood as "specific recognition". "Specific recognition" means that the bispecific antibody of the present invention does not cross-react with or does not substantially cross-react with any polypeptide other than the target antigen. And the degree of specificity may be judged by immunological techniques, including but not limited to immunoblotting, immunoaffinity chromatography, flow cytometry and the like. In the present invention, the specific recognition preference is determined by flow cytometry, while the standard of specific recognition in specific cases can be judged by the general technical personnel in the field according to their knowledge of the field. The term "bispecific antibody" refers to the bispecific antibody of the present invention, for example anti-Her2 antibody or antigen binding fragment thereof, can be derivatized or connected to another functional molecule, for example another peptide or protein (e.g., TAA, cytokines and cell surface receptors) to generate bispecific molecules that bind to at least two different binding sites or target molecules. To create a bispecific molecule of the present invention, an antibody of the present invention may be functionally connected (e.g., by chemical coupling, gene fusion, non-covalent binding, or other means) to one or more other binding molecules, such as another antibody, antibody fragment, peptide, or binding mimetic, thereby producing a bispecific molecule. For example, a "bispecific antibody" means that contains two variable domains or scFv units so that the resulting antibody recognizes two different antigens. Many different forms and uses of bispecific antibodies are known in the art (Chames P et al., curr. opin. drug disc. dev., 12: 276, 2009; Spiess C et al., Mol. Immunol., 67: 95-106, 2015).

The term "hCG-B carboxy terminal peptide (CTP)" is a short peptide from the carboxy terminal of β subunit of human chorionic gonadotropin (hCG). The four polypeptide hormones associated with reproduction, follicle-stimulating hormone (FSH), luteinizing hormone (LH), thyroid stimulating hormone (TSH) and chorionic gonadotropin (hCG), contain the same α-subunit and their respective specific β-subunit. Compared with the other three hormones, the in vivo half-life of hCG is obviously prolonged, which is mainly derived from the specific carboxyl terminal peptide (CTP) on its β-subunit. CTP contains 37 amino acid residues with 4 O-glycosylation sites, the terminal of the sugar side chain is sialic acid residues. Negatively charged, highly salivated CTP is capable of resisting renal clearance, thereby prolonging the in vivo half-life of the protein (Fares F A et al., Proc. Natl. Acad. Sci. USA, 89: 4304-4308, 1992).

The term "glycosylation" means that oligosaccharides (carbohydrates containing two or more monosaccharides connected together, for example 2 to about 12 monosaccharides connected together) attach to form glycoproteins. Oligosaccharide side chains are usually connected to the backbone of glycoproteins by N- or O-linkage. Oligosaccharides of the antibodies disclosed herein are usually connected to the CH2 domain of the Fc region as N-linked oligosaccharides. "N-linked glycosylation" refers to the carbohydrate moieties linked to the asparagine residues of glycoprotein chains. For example, the skilled person can recognize that each of CH2 domains of mouse IgG1, IgG2a, IgG2b and IgG3 and human IgG1, IgG2, IgG3, IgG4, IgA and IgD has a single site for N-linked glycosylation at residue 297.

In yet aspect, the amino acid sequence comprised in the heavy chain and light chain variable regions which comprised in the antibody of the present invention that are homologous to the amino acid sequences of the preferred antibodies described herein, and wherein the antibody retains the desired functional characteristics of the Her2× CD3 bispecific antibody described in the present invention.

Antibodies with conservative modification, the term "conservative modification" is intended to mean that amino acid modification will not significantly affect or change the binding features of antibodies containing the amino acid sequence. Such conservative modifications comprise amino acid substitutions, additions and deletions. Modifications can be introduced into the antibodies of the present invention by standard techniques known in the art, for example site-directed mutagenesis and PCR-mediated advantages. Conservative amino acid substitution refers to the substitution of an amino acid residue with an amino acid residue having a similar side chain. Families of amino acid residues having similar side chains are described in detail in the art. These families comprise amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), β-branched side chains (e.g., threonine, valine, isoleucine) and aromatic side chains (e.g., tyrosine, phenylalanine, tryptophan, histidine). Therefore, one or more amino acid residues in the CDR region of the antibody of the present invention can be replaced with other amino acid residues from the same side chain family.

An Fc variant with altered binding affinity for the neonatal receptor (FcRn), as used here, "FcRn" refers to a protein encoded at least in part by the FcRn gene that binds to the Fc region of an IgG antibody. The FcRn can be derived from any organism including but not limited to human, mouse, rat, rabbit and monkey. The functional FcRn protein comprises two chains, often referred to as heavy and light chains, the light chain is β-2-microglobulin and the heavy chain is encoded by the FcRn gene.

The present invention relates to a binding regulated antibody to FcRn (regulation comprises increasing as well as decreasing binding). For example, in some cases, increased binding will cause cells to recycle antibodies, and thus prolonging for example, the half-life of therapeutic antibodies. Sometimes it is desirable to reduce FcRn binding, for example serves as a diagnostic or therapeutic antibody including a radiolabel. Additionally, antibodies showing increased binding to FcRn while altered binding to other Fc receptors, for example Fcγ Rs, can be used in the present invention.

The application involves to antibodies including amino acid modifications that modulate the binding force to FcRn. It is of special significance that the binding affinity for FcRn is shown to increase at lower pH, whereas at higher pH the binding shows little change in the minimal incorporation of antibodies or their functional variants in the Fc domain.

The Fc variant with enhanced binding affinity to neonatal receptor (FcRn), whose plasma half-life depends on its binding to FcRn, generally binds at pH 6.0 and dissociates at pH 7.4 (plasma pH). Through the study of the binding sites of the both, the binding site of IgG on FcRn was modified to increase its binding ability at pH 6.0. It has been proved that mutations in some residues of human Fcγ domain which are important for binding FcRn can increase serum half-life. Mutations in T250, M252, S254, T256, V308, E380, M428, and N434(EU Nos.) have been reported to increase or decrease FcRn binding affinity (Roopenian DC et al., Nat. Rev. Immunol., 7: 715-725, 2007). Korean Patent No. KR 10-1027427 discloses trastuzumab (Herceptin, Genentech) variants with increased FcRn binding affinity, and these variants comprise one or more amino acid modifications selected from 257C, 257M, 257L, 257N, 257Y, 279Q, 279Y, 308F and 308Y. Korean Patent Publication No. KR 2010-0099179 provides Bevacizumab (Avastin, Genentech) variants and these variants show an increased half-life in vivo through amino acid modifications comprised in N434S, M252Y/M428L, M252Y/N434S and M428L/N434S. In addition, Hinton et al. also found that T250Q and M428L2 mutants increased the binding to FcRn by 3 and 7 times respectively. Mutating two sites at the same time increased the binding by 28 times. within rhesus monkeys, M428L or T250QM/428L mutants showed a 2-fold increase in plasma half-life (Hinton PR et al., J. Immunol., 176: 346-356, 2006). For more mutation sites comprised in Fc variants with enhanced binding affinity to the neonatal receptor (FcRn), may see in Chinese invention patent CN 201280066663.2. In addition, Studies have conducted T250Q/M428L mutations on the Fc segment of five humanized antibodies not only improved the interaction between Fc and FcRn, but also in the subsequent in vivo pharmacokinetic tests, it was found that the Fc mutant antibody was administered by subcutaneous injection, compared with wild-type antibodies, pharmacokinetic parameters have been improved, such as increased in vivo exposure, decreased clearance, and increased subcutaneous bioavailability (Datta-Mannan A et al., mabs. Taylor & Francis, 4: 267-273, 2012).

Other mutation points that can cause the enhancement of the affinity of the antibody of the present invention to FcRn including but are not limited to the following amino acid modifications: 226, 227, 230, 233, 239, 241, 243, 246, 259, 264, 265, 267, 269, 270, 276, 284, 285, 288, 289, 290, 291, 292, 294, 298, 299, 301, 302, 303, 305, 307, 309, 311, 315, 317, 320, 322, 325, 327, 330, 332, 334, 335, 338, 340, 342, 343, 345, 347, 350, 352, 354, 355, 356, 359, 360, 361, 362, 369, 370, 371, 375, 378, 382, 383, 384, 385, 386, 387, 389, 390, 392, 393, 394, 395, 396, 397, 398, 399, 400, 401, 403, 404, 408, 411, 412, 414, 415, 416, 418, 419, 420, 421, 422, 424, 426, 433, 438, 439, 440, 443, 444, 445, 446, wherein the amino acid number in Fc region is the number of the EU index in Kabat.

Fc variants with enhanced binding affinity to FcRn further comprise all other known amino acid modification sites and undiscovered amino acid modification sites.

In optional embodiments, IgG variants may be optimized to have increased or decreased FcRn affinity, as well as increased or decreased human FcγR, including but not limited to FcγRI, FcγRIIa, FcγRIIb, FcγRIIc, FcγRIIIa, and FcγRIIIb affinity including allelic variations thereof.

Preferably, the Fc ligand specificity of IgG variant will determine its therapeutic application. The use of a given IgG variant for therapeutic purposes will depend on the epitope or form of the target antigen, and the disease or indication to be treated. For most targets and indications, enhanced FcRn binding can be more preferred because enhanced FcRn binding may result in a prolonged serum half-life. The longer serum half-life allows for administration with lower frequency and dose during treatment. This characteristic may be particularly preferred when the therapeutic agent is administered in response to indications requiring repeated administration. For some targets and indications, the reduced affinity of FcRN may be particularly preferred when the variant Fc is required to have increased clearance or reduced serum half-life, for example, when the FC polypeptide is used as a developer or radiotherapy agent.

The prolonged half-life Fc change, as described herein "prolonged half-life Fc change" refers to a change in the in vivo half-life of a protein in an Fc polypeptide chain that prolongs a chain that comprises an altered Fc polypeptide as compared to the half-life of a similar Fc protein that comprises the same Fc polypeptide but does not comprise an alteration. The changes can be comprised in the Fc polypeptide chain which is the part of the bispecific antibody. T250Q, M252Y, S254T and T256E were changed (threonine at position 250 is changed to glutamine; methionine at position 252 is changed to tyrosine. Serine at position 254 is changed to threonine. And threonine at position 256 is changed to glutamic acid. Numbered according to EU numberings) are Fc changes that prolong the half-life and can be used in combination, alone or in any combination. These changes and some other changes are described in detail in U.S. Pat. No.7,083,784. The part of U.S. Pat. 7,083,784 describing such change is incorporated herein by reference.

Likewise, M428L and N434S are Fc changes with prolonged half-life and can be used in combination, alone or in any combination. These changes and other changes are described in detail in U.S. Patent Application Publication 2010/0234575 and U.S. Pat. No.7,670,600. The part of U.S. Patent Application Publication text 2010/0234575 and U.S. Pat. 7,670,600 describing such changes are incorporated herein by reference.

In addition, according to the meaning herein, any substitution at one of the following sites can be considered as a half-life prolonging Fc change: 250, 251, 252, 259, 307, 308, 332, 378, 380, 428, 430, 434, 436. Each of these changes, or a combination of these changes, can be used to prolong the half-life of the bispecific antibodies described herein. Other changes that can be used to prolong the half-life are described in detail in international application PCT/US2012/070146, which was filed on 17 Dec. 2012 (publication number: WO 2013/096221). The part of this application describing the foregoing changes is incorporated herein by reference.

Fc changes with prolonged half-life further comprise known technologies and sites that may be discovered in the future and modifications thereof.

The Fc can be derived from any organism including but are not limited to human, mice, rat, rabbit and monkey.

Nucleic acids encoding bispecific antibodies, using the therapeutic agents and antibodies or antibody fragments described herein, those skilled in the art can easily construct multiple clones containing functionally equivalent nucleic acids (e.g., nucleic acids having different sequences but encoding identical effector parts or antibody sequences). Therefore, the present invention provides bispecific antibodies, nucleic acids, nucleic acid variants, derivatives and species homologues encoding antibodies, antibody fragments and conjugates and fusion proteins thereof.

Many nucleic acid sequences encoding immunoglobulin regions comprising VH, VL, hinge, CH1, CH2, CH3, and CH4 regions are known in the art. See, for example, Kabat et al., Sequences of Proteins of Immunological Interest, Public Health Service N.I.H., Bethesda, MD, 1991. According to the teachings provided herein, those skilled in the art can combine the nucleic acid sequences and/or other nucleic acid sequences known in the art to construct nucleic acid sequences encoding bispecific antibodies of the present invention. Exemplary nucleotides encoding the bispecific antibody of the present invention comprise SEQ ID NO: 21.

In addition, based on the amino acid sequences provided herein and elsewhere and the general knowledge in this field, those skilled in the art can determine the nucleic acid sequence encoding the bispecific antibody of the present invention. In addition to the traditional methods of producing cloned DNA fragments encoding specific amino acid sequences, companies such as DNA 2.0 (Menlo Park, CA, USA) and Blue Heron (Bothell, WA, USA) usually adopt chemical synthesis to produce gene-sized DNA in any desired order, thus simplifying the process of producing the DNA.

The method for preparing the bispecific antibody can adopt any method known in the art to prepare the bispecific antibody of the present invention. The early methods of constructing bispecific antibodies are chemical crosslinking method or hybrid hybridoma or tetravalent tumor method (for example, Staerz U D et al., Nature, 314: 628-31, 1985; Milstein C et al., Nature, 305: 537-540, 1983; Karpovsky B et al., J. Exp. Med., 160: 1686-1701, 1984). Chemical coupling method is to connect two different monoclonal antibodies together in a chemical coupling way to prepare bispecific monoclonal antibodies. For example, chemical binding of two different monoclonal antibodies, or for example chemical binding of two antibody fragments, such as two Fab fragments. Hybrid-hybridoma method produces bispecific monoclonal antibodies by cell hybridization or ternary hybridoma, which is obtained by fusion of established hybridomas or fusion of established hybridomas and lymphocytes obtained from mice. Although these technologies are used to manufacture BiAb, various problems have caused such complexes to be difficult to use, such as producing mixed populations containing different combinations of antigen binding sites, difficulties in the aspect of protein expression, needing purity target BiAb, low yield, high production cost, etc.

Recent methods utilize genetically engineered constructs that can produce homogeneous products of a single BiAb without thorough purification to remove unwanted by-products. Such constructs comprise tandem scFv, double antibody, tandem double antibody, double variable domain antibody and heterodimerization using motifs such as Ch1/

Ck domain or DNL TM (Chames & Baty, Curr. Opin. Drug. Discov. Devel., 12: 276-83, 2009; Chames & Baty, mAbs, 1: 539-47). Related purification techniques are well known.

The monocytic antibody method can also be used to produce antibodies by cloning and expressing immunoglobulin variable region cDNA produced by single lymphocytes selected for producing specific antibodies, for example, by Babcook J et al., Proc. Natl. Acad. Sci. USA. 93: 7843-7848, 1996; the methods described in WO 92/02551; WO 2004/051268 and WO 2004/106377.

Antigen polypeptides used for producing antibodies such as those used for phage display (or expression on the surface of yeast cells or bacterial cells), for example, for immunizing hosts, can be prepared from genetically engineered host cells containing expression systems by methods well known in the art, or they can be recovered from natural biological sources. For example, nucleic acids encoding one or two polypeptide chains of bispecific antibodies can be introduced into cultured host cells by various known methods (such as transformation, transfection, electroporation, bombardment with nucleic acid-coated particles, etc.). In some implementations, the nucleic acid encoding the bispecific antibody can be inserted into a vector suitable for expression in the host cell before being introduced into the host cell. Typically, the vector may comprise sequence elements that enable the inserted nucleic acid to be expressed at the RNA and protein levels.

The vectors are well known in the art, and many are commercially available. Host cells containing the nucleic acid can be cultured under conditions that enable cells to express the nucleic acid, and the obtained BiAb can be collected from cell populations or culture media. Optionally, BiAb can be produced in vivo, for example, in plant leaves (see, such as., Scheller J et al., Nature Biotechnol., 19: 573-577, 2001 and the references cited therein), in bird eggs (see, such as, Zhu L et al., Nature Biotechnology., 23: 1159-1169, 2005 and references cited therein), or in mammalian milk (see, such as, Laible G et al., Reprod. Fertil. Dev., 25: 315, 2012).

A variety of host cells that can be used comprise, for example, prokaryotic cells, eukaryotic cells, bacterial cells (such as *Escherichia coli* or *Bacillus stearothermophilus*), fungal cells (such as *Saccharomyces cerevisiae* or *Pichia pastoris*), insect cells (such as Lepidoptera insect cells including *Spodoptera fruticosa* cells) or mammalian cells (such as Chinese hamster ovary (CHO) cells, NSO cells, baby hamster kidney (BHK) cells, monkey kidney cells, Hela cells, human hepatocellular carcinoma cells or 293 cells, etc.).

Bispecific antibodies can be prepared by immunizing suitable subjects (for example, rabbits, goats, mice, or other mammals, including transgenic and rejected foregoing mammals) with immunogenic preparations of bispecific antigens. Suitable immunogenic preparations may be, for example, chemically synthesized or recombinantly expressed bispecific antigens. The preparations may further comprise an adjuvant, for example Freund's complete adjuvant or incomplete adjuvant or similar immunostimulatory compounds. Furthermore, when used to prepare antibodies, especially by the way of in vivo immunization, the bispecific antigens of the present invention can be used alone or preferably as conjugates to vector proteins. such method of enhancing antibody response is well known in the art. According to different antibodies needed, different animal hosts can be used for in vivo immunization. A host that expresses useful endogenous antigens by itself can be used, or a host that has caused defects in useful endogenous antigens can be used.

Bispecific antibodies can be prepared by combining the methods described foregoing.

The bispecific antibody molecule of the present invention can be used as a monoclonal antibody (MAb) for each target. In some implementations, the antibody is chimeric, humanized or fully human.

The monoclonal antibody may be prepared by any method known in the art, such as hybridoma technology (Kohler & Milstein, Nature, 256: 495-497, 1975), trisource hybridoma technology, human B cell hybridoma technology (Kozbor D et al., Immunology Today, 4: 72, 1983) and EBV-hybridoma technique (Cole SPC et al., Monoclonal Antibodies and Cancer Therapy, PP77-96, Alan RLIS, Inc., 1985).

The bispecific antibody or part thereof of the present invention can be used to detect any or all of these antigens (for example, in biological samples, such as serum or plasma) by conventional immunological analysis methods, such as enzyme-linked immunosorbent assay (ELISA), radioimmunoassay (RIA) or histoimmunohistochemistry. The present invention provides a method for detecting an antigen in a biological sample, which comprises: contacting the biological sample with the bispecific antibody or antigen-binding fragment of the present invention which can specifically recognize the antigen, and detecting an antibody or part thereof which binds to an antigen, or a non-binding antibody or part thereof, thereby detecting the antigen in the biological sample. The antibody is directly or indirectly labeled with a detectable substance to facilitate detection of bound or unbound antibodies. Suitable detectable substances comprise various enzymes, repair groups, fluorescent substances, luminescent substances and radioactive substances. Examples of suitable enzymes comprise horseradish peroxidase, alkaline phosphatase, β-galactosidase, acetylcholinesterase; Examples of suitable repair group complexes comprise streptavidin/biotin and avidin/biotin; Examples of suitable fluorescent substances comprise 7-hydroxycoumarin, fluorescein, fluorescein isothiocyanate, rhodamine B, dichlorotriazine amine fluorescein, dansyl chloride or phycoerythrin; Examples of luminescent substances comprise 3-aminophthalic hydrazide; Examples of suitable radioactive substances comprise 1125, 1131, 5S or 3H.

Pharmaceutical compositions, bispecific antibodies of the present invention or nucleic acids or polynucleotides encoding antibodies of the present application may be used to prepare pharmaceutical compositions or sterile compositions, for example, bispecific antibodies are mixed with pharmaceutically acceptable vectors, excipients or stabilizers. Pharmaceutical compositions can comprise one or a combined (e.g., two or more different) bispecific antibodies of the present invention. For example, the pharmaceutical composition of the present invention may comprise a combination of antibodies or antibody fragments (or immunoconjugates) with complementary activities that bind to different epitopes on the target antigen. Preparations of therapeutic and diagnostic agents can be prepared by mixing with pharmaceutically acceptable vectors, excipients or stabilizers in the form of, for example, lyophilized powder, slurry, aqueous solution or suspension.

The term "pharmaceutically acceptable" refers to when molecular bodies, molecular fragments or compositions are properly administered to animals or humans, they will not produce adverse, allergic or other adverse reactions. Specific examples of some substances that can be used as pharmaceutically acceptable vectors or components thereof comprise sugars (such as lactose), starch, cellulose and derivatives thereof, vegetable oils, gelatin, polyols (such as propylene glycol), alginic acid, etc.

Bispecific antibodies or nucleic acids or polynucleotides encoding antibodies of the present application can be connected to or administered separately from the foregoing pharmaceutically acceptable vectors or some substances of their components (as immune complexes). In the latter case, the bispecific antibody or the nucleic acid or polynucleotide encoding the antibody of the present application can be administered before, after or together with some substances of the foregoing pharmaceutically acceptable vector or its components, or can be administered together with other known therapies (such as anti-cancer therapy, such as radiation).

The composition of the present invention may be in various forms. It comprises, for example, liquid, semisolid and solid dosage forms, for example liquid solutions (e.g., injectable and infusible solutions), dispersant or suspension tablet, pills, powders, liposomes and suppositories. The preferred way depends on the way of administration and the therapeutic use. Typical preferred compositions are injectable or infusible solutions, for example those similar to passive immunization of humans with other antibodies. The route of administration can take many forms, including oral, rectal, transmucosal, enteral, parenteral; intramuscular, subcutaneous, intradermal, intramedullary, intrathecal, intracardiac, intravenous, intraperitoneal, intranasal, intraocular, inhalation, insufflation, topical, dermal, percutaneous or intra-arterial. Preferred administration forms are parenteral (e.g., intravenous, subcutaneous, intraperitoneal, intramuscular). In a preferred implementation, the antibody is administered by intravenous injection or injection. In another preferred implementation, the antibody is injected through intramuscularly or subcutaneously.

The foregoing combination methods, treatment methods and administration methods are well known, and further comprise combinations, treatments and administration methods that may be developed in the future.

The pharmaceutical composition of the present invention can be a combination of two drugs, and can be a combination of products with similar functions and the same functions as those on the market or products with increased therapeutic effects

DESCRIPTION OF THE EMBODIMENTS

Figure 1:
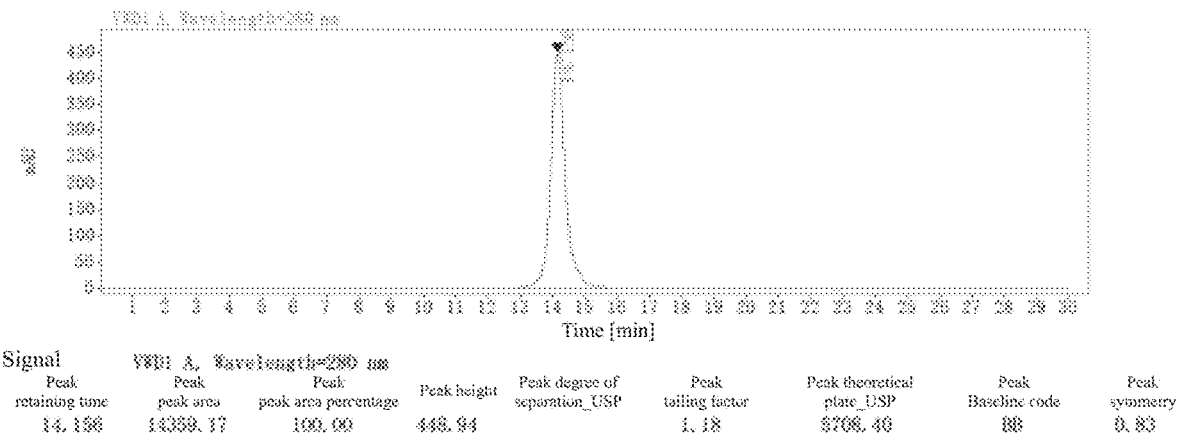
FIG. 1, SEC-HPLC test results of AP163 purified samples.

The present invention is further illustrated by the following embodiments, which should not be construed as further limiting. The contents of all drawings and all references, patents and published patent applications cited in the whole application are hereby expressly incorporated by reference.

In each of the following embodiments, the materials used in the experiment can be purchased or prepared with reference to the existing published technology; Those without marked source and specification are available on the market; various processes and methods not described in detail are conventional methods known in the art.

Embodiment 1, Construction of Bispecific Antibody Molecular Expression Vector

The bispecific antibody AP163 is composed of anti-BCMA scFv, linker peptide L2, anti-CD3 scFv and Fc fragment in series. VH and VL in anti-BCMA scFv and anti-CD3 scFv are connected by linker peptides L1 and L3 respectively. The VH and VL amino acid sequences of scFv against BCMA comprised in AP163 are as shown in SEQ ID NO: 7 and SEQ ID NO: 8, respectively. The VH and VL amino acid sequences of the anti-CD3-scFv comprised in AP163 are as shown in SEQ ID NO: 17 and SEQ ID NO: 18, respectively, and VH and VL are connected by (GGGGS (SEQ ID NO: 22))$_3$. The Fc fragment comprised in AP163 derives from human IgG1, and has several amino acid displacement/substitutions, respectively L234A, L235A, T250Q, N297A, P331S and M428L(EU numbering), meanwhile, K447 at the c-terminal of the Fc fragment is deleted/deleted (EU numbering). Its linker peptide (L2) is composed of flexible peptide and rigid peptide, and the flexible peptide is G2(GGGGS)$_3$ (SEQ ID NO: 29), while the rigid peptide is SSSSKAPPPS (SEQ ID NO: 24). While the composition of linker peptides L1 and L3 in each scFv is (GGGGS (SEQ ID NO: 22))$_3$.

According to the conventional molecular biology method, the coding genes of the foregoing bispecific antibodies are synthesized, and the coding cDNA of the obtained fusion genes are respectively inserted into the corresponding enzyme cutting sites of the eukaryotic expression plasmid pCMAB2M modified by PCDNA3.1. Plasmid pCMAB2M also contains selective markers, so it can have kanamycin resistance in bacteria and can have G418 resistance in mammalian cells. Additionally, when the host cell is DHFR gene expression deficient, the pCMAB2M expression vector contains mice dihydrofolate reductase (DHFR) gene, so that the target gene and DHFR gene can be co-amplified in the presence of methotrexate (MTX) (see U.S. Pat. U.S. Pat. No. 4,399,216).

Embodiment 2, Expression of Bispecific Antibody Molecules

The expression plasmid constructed foregoing was transfected into mammalian host cell lines to express bispecific antibodies. The host cell line is DHFR enzyme deficient CHO cell (see U.S. Pat. U.S. Pat. No. 4,818,679), and the host cell in this embodiment selectes CHO-derived cell strain DXB11.

A preferred transfection method is electroporation, but other methods including calcium phosphate co-precipitation and lipofection can also be used. In electroporation, 50 μg expression vector plasmid DNA was added to $5\times10^7$ cells in a cuvette with a Gene Pulser electroporator (Bio-Rad Laboratories, Hercules, CA) set at 300V electric field and 1500 μFd capacitance. Two days after transfection, the culture media was changed into growth medium containing 0.6 mg/mL G418. The subcloned transfectants were diluted to limit, and the secretion rate of each cell line was determined by ELISA. Screening out cell strains expressing bispecific antibodies at high level.

Co-amplification of DHFR gene inhibited by MTX drugs mainly comprises the following steps: co-amplification of transfected fusion protein gene with DHFR gene in growth medium containing increasing concentration of MTX. Limiting dilution of subclones with positive DHFR expression, gradually pressurizing and screening out transfectants which can grow in MTX medium up to 6 μM, determining their secretion rate, screening out cell lines with high expression of foreign proteins. Cell lines with a secretion rate of more than 5 (more preferably about 15) $\mu g/10^6$ (i.e., one million) were subjected to adaptive suspension culture using serum-free medium. Collecting cell supernatant and separating, purifying bispecific antibody.

Embodiment 3, Purification of Bispecific Antibody

The bispecific antibody AP163 was purified by three-step chromatography. They are affinity chromatography, hydroxyapatite chromatography and anion exchange chromatography (the protein purifier used in this embodiment is AKTA pure 25M of GE company in the United States. The reagents used in this embodiment are all purchased from Sinopharm Chemical Reagents Co., Ltd., and their purity is of analytical grade).

The first step, affinity chromatography: adopt MabSelect Sure affinity chromatography media of GE company (MabSelect Sure, purchased from GE company) or other commercially available affinity media (for example Diamond protein A of Bergeron company, etc.) for sample capture, concentration and partial pollutant removal. Firstly, the equilibrium buffer (20 mM PB, 140 mM NaCl, pH 7.4) is used to balance 3-5 column volumes (CV) of the chromatographic column at a linear flow rate of 100-200 cm/h; sample the clarified fermentation broth at a linear flow rate of 100-200 cm/h, and the load is not more than 20 mg/m; After loading the sample, balance 3-5 column volumes (CV) of chromatographic column with balance buffer(20 mM PB, 140 mM NaCl, pH 7.4) at a linear flow rate of 100-200 cm/h to wash unbound components; use decontamination buffer 1(50 mM NaAc-HAc, 1 M NaCl, pH 5.0) to wash 3-5 column volumes of chromatographic column at a linear flow rate of 100-200 cm/h to remove some pollutants; use decontamination buffer 2(50 mM NaAc-HAc, pH 5.0) to balance 3-5 column volumes (cv) of the chromatographic column at a linear flow rate of 100-200 cm/h; then eluting the target product with elution buffer(40 mM NaAc-HAc, pH 3.5) at a linear flow rate not higher than 100 cm/h, and collecting the target peak.

The second step, hydroxyapatite chromatography: using CHT TypeII of BIO-RAD company or other commercially available hydroxyapatite media (CHT TypeII, purchased from BIO-RAD company) for intermediate purification to reduce polymer content. After the target protein is polymerized, there are differences in properties between polymer and monomer, including charge characteristics as well as calcium ion chelation. We use the difference in charge characteristics to separate the both. At first, the equilibrium buffer(20 mM PB, pH 7.0) is used to balance 3-5 column volumes (CV) of the chromatographic column at a linear flow rate of 100-200 cm/h; the target protein obtained by affinity chromatography in the first step is adjusted to pH 7.0, then loaded with the sample, the load was controlled less than 5 mg/ml; after loading the sample, wash the chromatographic column for 3-5 column volumes (CV) at a linear flow rate of 100-200 cm/h with a balance buffer (20 mM PB, pH 7.0); at last, the target protein was eluted with an elution buffer(20 mM PB, 1M NaCL, pH 7.0) at a gradient of 0-50% and 10 column volumes (CV) at a linear flow rate not higher than 100 cm/h, the eluted components were collected in sections and sent to SEC-HPLC. Combining target components with monomer percentage greater than 95% for next chromatography.

The third step, using anion exchange chromatography: Q-HP of Bergeron company or other commercially available anion exchange chromatography media (Q-HP, purchased from Bergeron company) (for example, Q HP of GE, Toyopearl GigaCap Q-650 of TOSOH, DEAE Beads 6FF of Tiandi Renhe, Generik MC-Q of Sepax technology, Fractogel EMD TMAE of Merck, Q Ceramic HyperD F of Pall) for fine purification to further remove pollutants (HCP and DNA, etc.). firstly, washing the chromatographic column by using an equilibrium buffer(20 mM PB, 0.15M NaCL, pH 7.0) at a linear flow rate of 100-200 cm/h for 3-5 column volumes (cv); sample the target protein separated by hydroxyapatite chromatography in the second step, collect and flow through, after loaded with sample, and wash the chromatographic column for 3-5 column volumes (CV) with equilibrium buffer (20 mM PB, 0.15M NaCL, pH 7.0) at a linear flow rate of 100-200 cm/h; collect the components of the permeation, and send samples for protein content, SEC-HPLC and electrophoresis detection.

Figure 2:
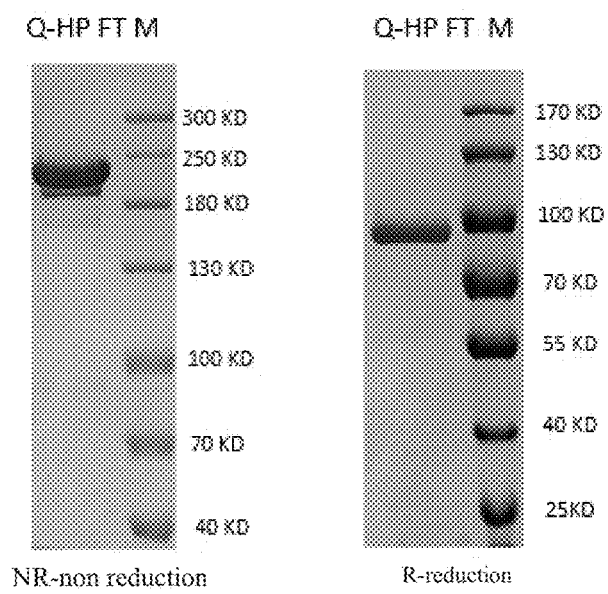
FIG. 2, SDS-PAGE electrophoresis results of AP163 purified samples.

SEC-HPLC purity results and SDS-PAGE electrophoresis results of the samples are shown in FIG. 1 and FIG. 2 respectively, in which SEC-HPLC results show that the purity of the main peak of bispecific antibody after three-step chromatography is over 95%, and the SDS-PAGE electrophoresis band pattern is in line with expectations. after non-reduction electrophoresis (180 KDa), a clear (90 KDa) single chain band can be obtained after reduction.

Embodiment 4, Biological Function Evaluation of Anti-BCMA×CD3 Bispecific Antibody in vitro (1) Binding Activity of Bispecific Antibody to BCMA Positive Cells and T Cells Human myeloma NCI-H929 cells, human Jurkat-LUC cells, human T-lymphocyte leukemia HUT-78 cells, human myeloma MM.1S cells, human promyelocytic leukemia HL60 cells, human T cells and cynomolgus monkey T cells were cultured, the cells were collected by centrifugation and resuspended with 1% DPBS (Duchenne Phosphate Buffer), and the cell densities were adjusted to 2×106 cells/ml respectively, place in 96-well plates, 100 μl per well. The bispecific antibody AP163 to be tested was diluted by gradient, 100 μl per well, incubated in 5% $CO_2$ incubator at 37° C. for 1 hour. Centrifuge, add 200 μl 1% DPBS to each well, wash for 2 times, centrifuge to remove supernatant, add 100 μl fluorescent secondary antibody (Alexa Fluor® 647 goat anti-human IgG(H+L) antibody) to each well, incubate for 1 h in 5% $CO_2$ incubator at 37° C. Centrifuge to remove supernatant, wash the plate twice with 1% DPBS, add 100 μl 1% DPBS to each well for resuspension, and detect the signal intensity by flow cytometry. With the average fluorescence intensity as the y axis and antibody concentration as the x axis, the binding activity of AP163 with BCMA+ cells and CD3+ cells was calculated by using a software GraphPad Prism 6.

Figure 3:
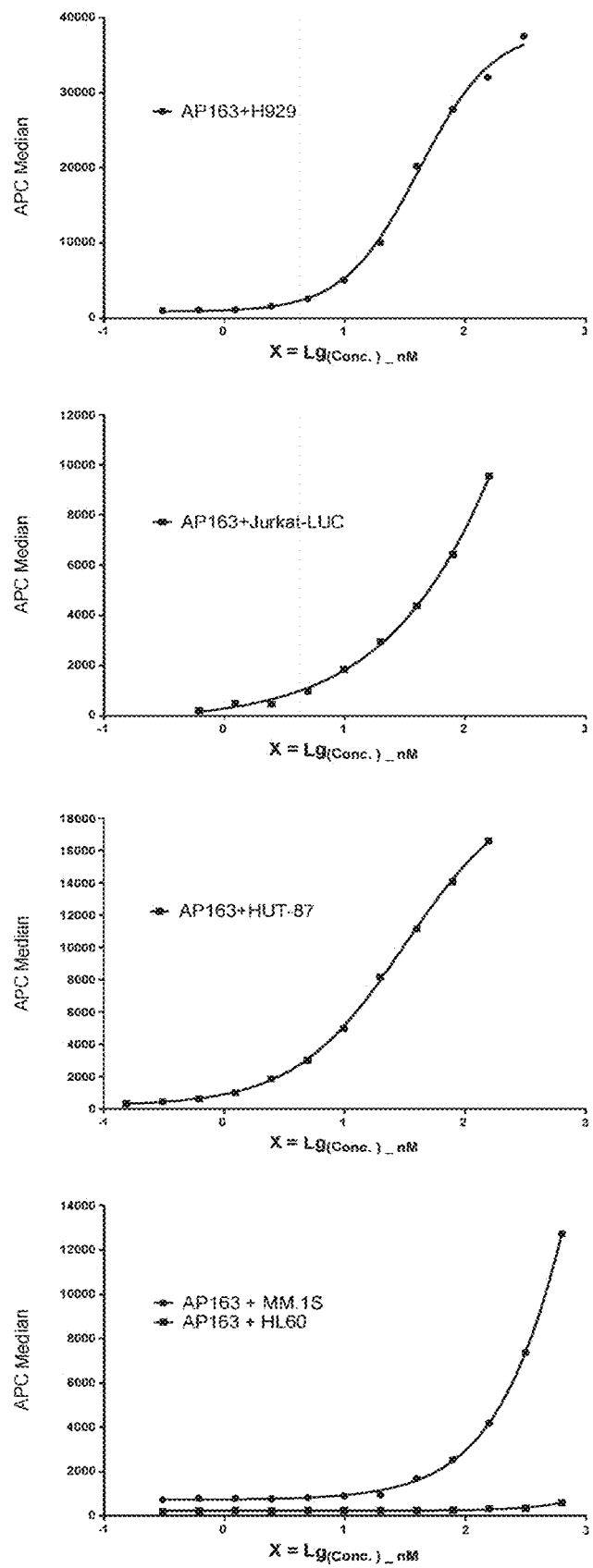
FIG. 3, determination of binding ability of bispecific antibody to BCMA positive cells.
Figure 4:
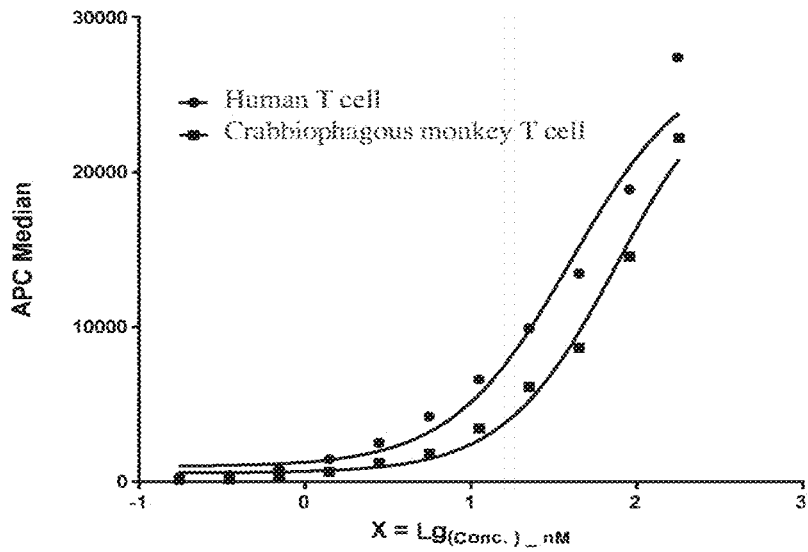
FIG. 4, determination of binding ability of bispecific antibody to different T cells.

As shown in FIG. 3, FIG. 4, at the cell level, AP163 can specifically bind to BCMA positive cells and have dose-effect relationship; at the same time, AP163 can highly specifically bind to human T cells and cynomolgus monkey T cells, and have dose-effect relationship.

(2) Determination of Binding Ability and Cross-Reactivity of Bispecific Antibodies to Cd3 and BCMA Proteins of Human Monkey Species CD3 and BCMA of human and monkey coated with antigen were diluted to 0.1 μg/ml with PBS, added into 96-well plate, coated at 2-8° C. overnight. The liquid in the plate was discarded, PBST containing skimmed milk powder was added to seal it at room temperature for 2 h, PBST washed the plate twice. The bispecific antibody to be tested was diluted 4 times, with 12 gradients, 2 wells per concentration, 100 μl/well added to the 96-well plate, and incubated at room temperature for 2 hours. Unbound bispecific antibody was washed away with PBST, biotinylated human BCMA protein or human CD3 protein was diluted to 0.1 μg/ml, and HRP-labeled streptavidin (BD, Item No.554066) was mixed in 1:1000, and added to 96-well plate, 100 μl/well, incubated for 1 h at room temperature. Thereafter, the 96-well plate was washed with PBST, TMB was added, 100 μl/well, the color was developed at room temperature in the dark for 2-3 min, then 1 M HCL was added to stop the color reaction. The absorbance of OD450 nm was detected by microplate reader. Using logarithmic value of sample concentration as abscissa and absorbance value as ordinate, a four-parameter nonlinear regression and a variable slope equation were made. The $EC_{50}$ value of binding of bispecific antibody to antigen was calculated. The experimental results are shown in Table 1, the $EC_{50}$ value of bispecific antibody binding to human CD3 and BCMA protein and cynomolgus monkey CD3 and BCMA protein is very small, the binding ability of bispecific antibody to different species antigens is basically the same.

TABLE 1 determination result of the binding ability and cross reactivity of bispecific antibody to human monkey species CD3 and BCMA proteins

| | | AP163 concentration (μg/ml) | | | | |
|---|---|---|---|---|---|---|
| | | 0.001 | 0.01 | 0.015 | 0.1 | 0.15 |
| $EC_{50}$ | humanCD3 | 0.1 | 0.12 | 0.75 | 1.3 | 1.6 |
| | monkeyCD3 | 0.1 | 0.12 | 0.75 | 1.3 | 1.6 |
| | humanBCMA | 0.1 | 0.12 | 0.25 | 0.6 | 1.25 |
| | monkeyBCMA | 0.1 | 0.12 | 0.25 | 0.7 | 1.25 |

(3) Determination of the Ability of Bispecific Antibody to Bind Target Cells and Effector Cells at the Same Time.

Figure 5:
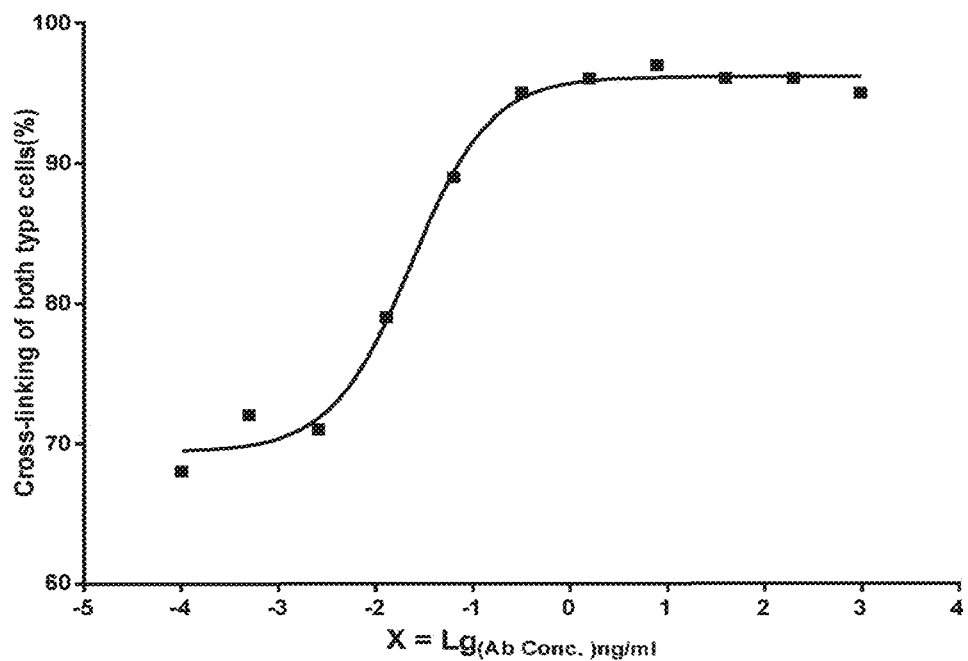
FIG. 5, determination of ability of bispecific antibody to bind target cells and effector cells simultaneously.

Normal cultured human myeloma NCI-H929 cells were used as target cells, which were stained and labeled with PKH26 staining reagent, the cells were resuspended with 1640 complete culture media, the cell density was adjusted to 1×10$^5$ cells/ml, and 50 μl/well was added into 96-well cell culture plate. The bispecific antibody was diluted with culture medium gradient, added at 50 μl/well. Add effector cells (amplify cultured T cells) 5 times as many as target cells, 50 μl/well. Incubate in 5% $CO_2$ incubator at 37° C. for 1 h, so that the sample to be tested and cells are fully mixed and bridge reaction occurs. Wash the 96-well plate with DPBS, detect it by flow cytometry, and capture T cells, then T cells with PKH26 signal are bridged cells, calculate the bridging ratio by statistical data. It can be seen from FIG. 5 that AP163 can specifically induce bridging reaction between tumor cells and target cells, and has a dose-effect relationship.

(4) Activation of CD4+T Cells/CD8+T Cells Mediated by Bispecific Antibodies

Three healthy voluntary blood donors were recruited, peripheral blood was extracted and PBMC was extracted, CD4+T cells and CD8+T cells in PBMC were separated and enriched by CD4+T cell separation kit and CD8+T cell separation kit, the cells were suspended in 1640 complete culture medium containing 10% FBS, and the cell density was adjusted to 1×10$^6$ cells/ml, and added to 96-well cell culture plate with 50 μl/well. Human myeloma NCI-H929 cells were cultured, the cell density was adjusted to 1×10$^5$ cells/ml, 50 μl was added to each well. The bispecific antibody was diluted by gradient, and was added into 96-well plate at 50 μl/well, and incubated in incubator at 37° C. for 24 hours. The supernatant was centrifuged, and the release of granzyme in the supernatant was detected by ELISA. The $EC_{50}$ of CD4+T cell/CD8+T cell activation mediated by bispecific antibody was calculated by GraphPad Prism 6.

Figure 6:
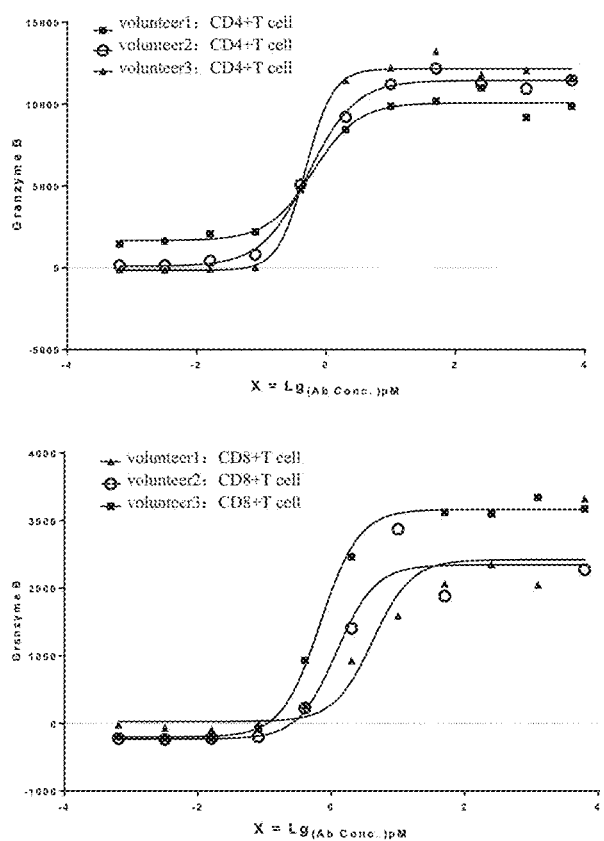
FIG. 6, activation of CD4+T cells/CD8+T cells mediated by bispecific antibodies.

As shown in FIG. 6 and table 2, AP163 can mediate the release of granzyme when CD4+T cells and CD8+T cells of three healthy volunteers kill tumor cells, with a dose-effect relationship.

TABLE 2

EC$_{50}$ of releasing granzyme by activating CD4+ T cells/CD8+ T cells mediated by bispecific antibody

| Volunteer No. | CD4+ T cells (pM) | CD8+ T cells (pM) |
|---|---|---|
| 1 | 0.6275 | 4.204 |
| 2 | 0.5341 | 1.202 |
| 3 | 0.4826 | 0.6863 |

(5) Evaluation of the Ability of Bispecific Antibody to Activate T Cells

Jurkat T cells containing NFAT RE reporter gene (purchased from BPS Bioscience) can overexpress luciferase in the presence of bispecific antibody and BCMA positive cells, the activation degree of Jurkat T cells can be quantified by detecting the activity of luciferase. In particularly, H929 cells were centrifuged and resuspended, the cell density was adjusted to $2 \times 10^5$ cells/ml, and 40 μl/well was added into a 96-well cell culture plate. The NFAT-Jurkat cell density was adjusted to $2 \times 10^6$ cells/ml, and 40 μl was added to each well. The bispecific antibody AP163 was diluted to 50 μg/mL with culture medium, after 10 times dilution, 20 μl was added to each well, and incubated in 5% CO$_2$ incubator at 37°° C. for 48 hours. After washing the plate, 100 μl/well of Steady-Glo® Luciferase was added respectively, and after 5 minutes of reaction, the cold luminescence value was detected by enzyme-labeled instrument. With the concentration of bispecific antibody as the x-axis and the intensity of fluorescein as the y-axis, the EC$_{50}$ of T cells activated by bispecific antibody was calculated by the software GraphPad Prism 6.

Figure 7:
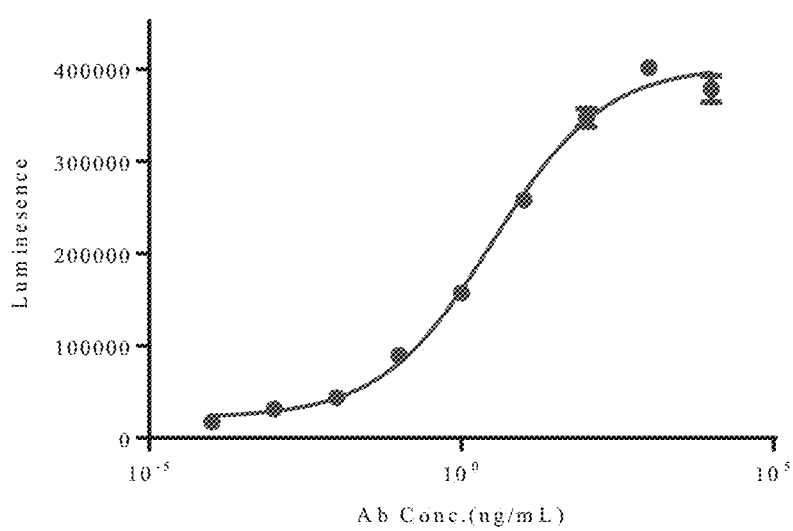
FIG. 7, determination of ability of bispecific antibody to activate Jurkat T cells of reporter gene cell strains.

As shown in FIG. 7, AP163 can specifically activate NFAT-Jurkat cells with EC$_{50}$ value of 3.161 ng/ml, and its concentration is proportional to the signal intensity.

(6) The Ability of T Cells to Kill Tumor Cells Mediated by Bispecific Antibodies T cells of human and cynomolgus monkeys were cultured, the cell density was adjusted to 106 cells/ml, and 50 μl/well were added into 96-well cell culture plates respectively. Normal cultured human myeloma NCI-H929 cells were used as target cells, and the cell density was adjusted to $1 \times 10^5$ cells/ml, and 50 μl/well was added. Then, 50 μl of gradient diluted bispecific antibody AP163 was added to each well, and was incubated for 24 h in 5% CO$_2$ incubator at 37° C. Add 40 μl Bright-Glo reagent to each well, and let it stand for 3 min at room temperature in the dark. the RLU value was detected by multi-functional microplate reader, and analyzed by software GraphPad Prism 6, and the EC$_{50}$ value of killing H929 cells mediated by bispecific antibody was calculated.

Figure 8:
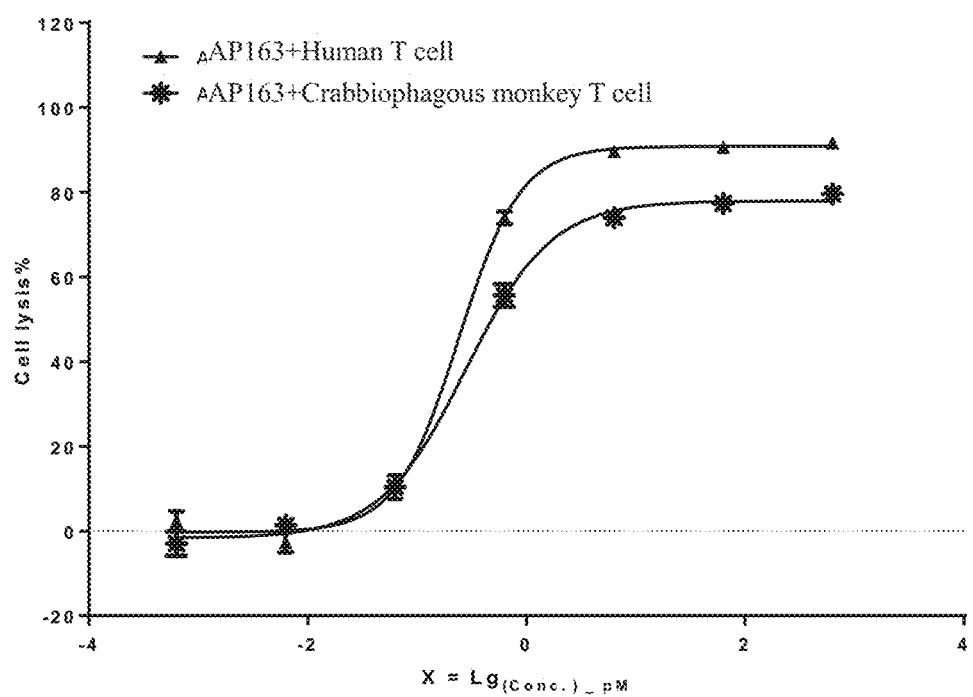
FIG. 8, determination of ability of bispecific antibody-mediated T cells to kill tumor cells.

As shown in FIG. 8, the EC$_{50}$ value of AP163 mediated human t cells killing tumor cells was 0.239 pM, and that of cynomolgus monkey t cells killing tumor cells was 0.278 pM. AP163 can specifically mediate T cells of human and cynomolgus monkeys to kill tumor cells, and H929 cells with high expression of BCMA showed significant killing effect, with a dose-effect relationship.

(7) Evaluation of Cytokine Release Caused by Bispecific Antibody

To evaluate the ability of bispecific antibody to activate T cells alone or depending on target cells to cause cytokine release.

Primary T cells were cultured, centrifuged, collected and resuspended with 1% PBSB, the cell density was adjusted to $1 \times 10^6$ cells/ml, respectively, and placed in a 96-well plate with 90 μl/well. The maternal monoclonal antibody AB314 (refer to WO2007042261 patent document for details) and bispecific antibody AP163, which recognize CD3, are diluted to 10000 ng/mL with culture medium respectively. after 10 times gradient dilution, 10 μl/well is added to 96-well plate, and then cultured in 37° C., 5% CO$_2$ incubator. After incubation for 24 h and 48 h, the supernatants were collected and analyzed by LEGENDplex™ human Th1/Th2 kit, and the signal intensity was detected by flow cytometry. With cytokine concentration as y-axis and antibody concentration as x-axis, the release of cytokines from activated t cells by AB314 and AP163 was calculated by using GraphPad Prism 6. The results showed that in the absence of target cells, AB314 activated primary T cells for 24 hours, which caused the release of cytokines IL-4, IL-5 and TNF-α; however, AP163 activated primary T cells, and there was no significant cytokine release in 24 h and 48 h.

Human T cells were cultured, centrifuged and collected, and suspended in 1640 complete culture medium of 10% FBS, the cell density was adjusted to $1 \times 10^6$ cells/ml, and placed in a 96-well plate with 50 μl/well. The cell density of human myeloma NCI-H929 was adjusted to $1 \times 10^5$ cells/ml, and 50 μl/well was added. After gradient dilution, AP163 was added into 96-well plate at 37°° C. in 5% CO$_2$ incubator for 1,2,3,4,5,6,24 h respectively. After incubation, 50 μl supernatant was taken from each well, and the release of 8 cytokines in the supernatant was detected by 8 cytokine detection kit. The experimental results show that AP163 can activate T cells to release IL-5, IL-13, IL-2, IL-6, IL-10, IFN-γ, TNF-α and IL-4 in a time-dependent manner, as shown in table 3.

TABLE 3 release of cytokines caused by bispecific antibodies

| time | IL-5 (pg/ml) | IL-13 (pg/ml) | IL-2 (pg/ml) | IL-6 (pg/ml) | IL-10 (pg/ml) | IFN-γ (pg/ml) | TNF-α (pg/ml) | IL-4 (pg/ml) |
|---|---|---|---|---|---|---|---|---|
| 1 h | <1.95 | <1.82 | <2.19 | <0.43 | <2.07 | <52.52 | <1.82 | <1.95 |
| 2 h | <1.95 | <1.82 | <2.19 | <0.43 | <2.07 | <52.52 | <1.82 | <1.95 |
| 3 h | <1.95 | 8.73 | <2.19 | <0.43 | <2.07 | 365.35 | 124.72 | <1.95 |
| 4 h | <1.95 | 17.83 | 4.73 | <0.43 | <2.07 | 678.89 | 201.7 | <1.95 |
| 5 h | <1.95 | 16.05 | 4.83 | <0.43 | <2.07 | 646.17 | 210.06 | <1.95 |
| 6 h | <1.95 | 34.98 | 6.42 | <0.43 | <2.07 | 1203.93 | 263.52 | <1.95 |
| 24 h | 100.71 | 89.98 | <2.19 | <0.43 | 3.98 | >1706.27 | 203.47 | 4.81 |

(8) T Cells Mediated by Bispecific Antibodies Kill BCMA-Positive Human Tumor Cells Under Different Effective Target Ratios To culture human T cells, the cell densities were adjusted to $2 \times 10^7$ cells/ml, $1 \times 10^7$ cells/ml, $1 \times 10^6$ cells/ml, $1 \times 10^5$ cells/ml, $1 \times 10^4$ cells/ml and $1 \times 10^3$ cells/ml, and 50 μl per well was added to 96-well cell culture plates. Human myeloma NCI-H929 cells were used as target cells, and the cell density was adjusted to 1×10$^5$ cells/ml, and 50 μl/well was added. Then, 50 μl of gradient diluted AP163 was added to each well, and was incubated for 24 h in 5% $CO_2$ incubator at 37° C. Add 40 μl Bright-Glo reagent to each well, and let it stand for 3 min at room temperature in the dark. the RLU value was detected by multi-functional microplate reader, and analyzed by software GraphPad Prism 6, and the EC50 value of killing H929 cells mediated by bispecific antibody was calculated.

Figure 9:
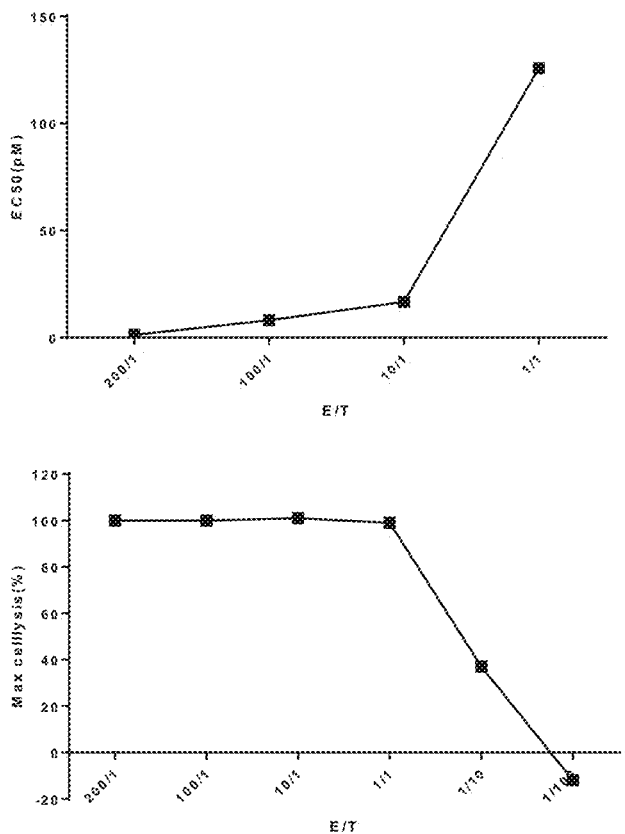
FIG. 9, determination of ability of bispecific antibody-mediated T cells to kill BCMA positive cells under different ratio of effect to target.

As shown in FIG. 9, when ratio of effect to target (E/T) is higher than 1/1, the efficiency of AP163-mediated T cell killing tumor cells can reach 100% killing; when E/T is lower than 1/1, $EC_{50}$ value gradually increases with the decrease of E/T.

(9) To Evaluate the Effects of Dexamethasone and Indomethacin on AP163-Mediated PBMC Killing Tumor Cells Twelve healthy voluntary blood donors were recruited, peripheral blood was extracted and PBMC was extracted, day of grouping, and all groups were given intraperitoneal injection, while the control group was given PBS solution with the same volume, and the dose of AP163 was 0.2 mg/kg. It was administered twice a week for 4 weeks. The tumor volume and weight were measured once every three days, and the weight and tumor volume of mice were recorded. At the end of the experiment, the animals were euthanized, and the tumors were stripped, weighed and photographed, and the relative tumor inhibition rate (TGI %) was calculated.

As shown in Table 4, at the end of the experiment, the average tumor volume of 1/1 control group and 1/2 control group was 1501+351 mm$^3$ and 1555+244 mm$^3$; respectively, the mean tumor volume and TGI % of 1/1 AP163 experimental group were 99+38 mm$^3$ and 93%, respectively. the mean tumor volume and TGI % of 1/1 AP163 experimental group were 481+215 mm$^3$ and 70.2%. The foregoing results indicated that AP163 has an obvious tumor-inhibiting effect, and at the same time, AP163 is safe and has no obvious toxic effects on experimental animals.

TABLE 4

Pharmacodynamic effect of AP163 on NCI-H929 NPG mouse model

| CIK/NCI-H929 | groups | dose (mg/kg) | administration mode | tumor volume (mm$^3$) | tumor weight (g) | tumor inhibition rate (%) |
|---|---|---|---|---|---|---|
| 1/1 | PBS | — | i.p.biw | 1501 ± 351 | 2.34 ± 0.46 | — |
| 1/1 | AP163 | 0.2 | i.p.biw | 99 ± 38 | 0.17 ± 0.06 | 93 |
| 1/2 | PBS | — | i.p.biw | 1555 ± 244 | 2.32 ± 0.28 | — |
| 1/2 | AP163 | 0.2 | i.p.biw | 481 ± 215 | 0.69 ± 0.37 | 70.2 |

Note:
i.p: intraperitoneal injection,
biw: twice a week the cells were suspended in 1640 complete culture medium containing 10% FBS, and the cell density was adjusted to 3×10$^6$ cells/ml. 50 μl per well was added to the 96-well cell culture plate. Diluents of dexamethasone and indomethacin were prepared, and 50 μl per well was added to the 96-well plate to incubate PBMC for 1 h and 14 h, respectively; the control group was added with the same volume of buffer. The adjusted cell density of human myeloma NCI-H929 cells was 1×10$^5$ cells/ml, with 50 μl per well. Then, 50 μl of gradient diluted AP163 was added to each well, and incubated in 5% $CO_2$ incubator at 37°° C. for 4, 8, 12, 24, 48 h respectively, 40 μL of Bright-GLO reagent was added to each well, and left standing at room temperature for 3 min in the dark, the RLU value was detected by multi-functional microplate reader. The analysis of data showed that the incubation of PBMC with dexamethasone or indomethacin had little effect on AP163-mediated PBMC killing tumor cells.

Embodiment 5 Pharmacodynamic Study of Anti-BCMA×CD3 Bispecific Antibody in Mice Transplanted Tumor Model (1) NPG Mice Were Subcutaneously Inoculated with Human CIK Cells and Human Myeloma Cells NCI-H929 to Make a Transplanted Tumor Model.

Human myeloma NCI-H929 cells and CIK cells (induced by activation of human PBMC to the 10th day) were inoculated subcutaneously in the right anterior flank of female NPG mice in different proportions. One hour after inoculation, mice were randomly divided into 4 groups, with 4 mices in each group. The administration was started on the (2) NPG Mice Were Subcutaneously Inoculated with Human CIK Cells and Human Burkkit's Lymphoma Raji Cells to Make a Transplanted Tumor Model.

Raji cells of human Burkkit's lymphoma were mixed with CIK after culture and amplification (the proportion of Raji cells to CIK cells was 1:1), and mixed with Matrigel in a volume proportion of 1:1 and inoculated subcutaneously on the right back of female NPG mice. One hour after inoculation, mice were randomly divided into 4 groups according to their body weight. On the same day of grouping, the control group was administrated the same volume of PBS solution, the administration doses of the experimental group of AP163 was 1 mg/kg, 0.1 mg/kg and 0.01 mg/kg respectively. All groups were administrated intraperitoneal injection twice a week for 3 weeks. The tumor volume and weight were measured once every three days, and the weight and tumor volume of mice were recorded. At the end of the experiment, the animals were euthanized, and the tumors were stripped, weighed and photographed, and the relative tumor inhibition rate (TGI %) was calculated.

The results are seen in Table 5, at the end of the experiment, the average tumor volume of the control group was 1750+653 mm3; the mean tumor volume of AP163 1 mg/kg, 0.1 mg/kg and 0.01 mg/kg test group was 0.00+0.00 mm3, which were significantly different from that of solvent control group (P<0.05), the TGI of the three groups was 100%, which indicated that the bispecific antibody AP163 had extremely significant anti-tumor effect.

TABLE 5

Pharmacodynamic effect of AP163 on Raji NPG mice model

| groups | administration | dose (mg/kg) | administration mode | tumor volume (mm$^3$) | tumor weight (g) | tumor inhibition rate (%) |
|---|---|---|---|---|---|---|
| Control group | PBS | — | i.p.biw*6 | 1750 ± 653 | 2.158 ± 0.945 | — |
| L | AP163 | 0.01 | i.p.biw*6 | 0 | 0 | 100 |
| M | AP163 | 0.1 | i.p.biw*6 | 0 | 0 | 100 |
| H | AP163 | 1 | i.p.biw*6 | 0 | 0 | 100 |

Note:
i.p: intraperitoneal injection,
biw: twice a week (3) NPG Mice Were Subcutaneously Inoculated with Human CIK Cells and Human Myeloma Cells RPMI-8226

Human myeloma cells RPMI-8226 and CIK were inoculated subcutaneously on the right back of female NPG mice, after inoculation for 1 hour, they were randomly divided according to the weight of mice, and the drug was administered on the same day. There are 7 rats in the first group and 8 rats in the rest of the two groups. On the same day of grouping, the control group was given the same volume of PBS solution, and the dose of AP163 experimental group was 1 mg/kg and 0.1 mg/kg, respectively. All groups were administrated an intraperitoneal injection once every two days for 8 consecutive times, and the experiment ended 18 days after the last administration. The tumor volume and weight were measured twice every week, and the weight and tumor volume of mice were recorded. At the end of the experiment, the animals were euthanized, and the tumors were stripped, weighed and photographed, and the relative tumor inhibition rate (TG1 %) was calculated.

Figure 10:
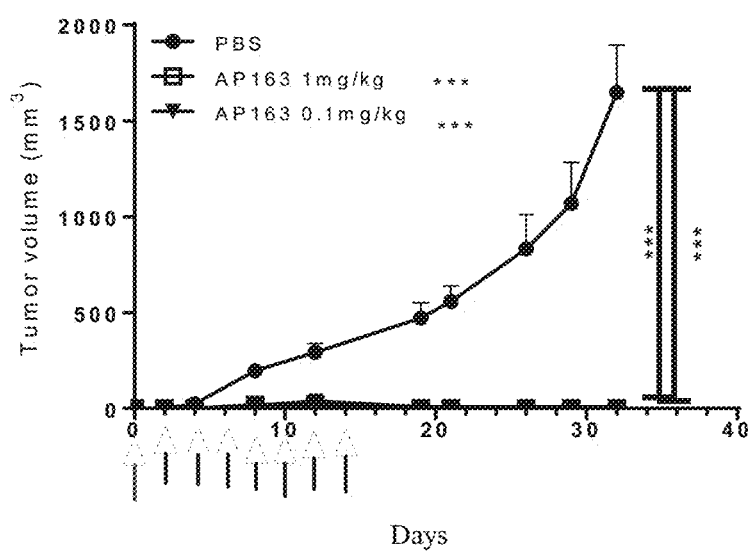
FIG. 10, in vivo anti-tumor effect of bispecific antibody in the transplanted tumor model of subcutaneous co-inoculation of human CIK cells and human myeloma cells RPMI-8226 in NPG mice. Note: The arrow represents the time of each administration; indicates that there are significant differences.

As shown in FIG. 10, at the end of the experiment (32 days after the first administration), the weight of animals in each group increased, and there was no significant difference in the weight of animals in different groups (P>0.05). The average tumor volume of the control group was 1647.79+247.90mm$^3$; the mean tumor volume of AP163 1 mg/kg test group was 0.00+0.00mm$^3$, and TGI % was 100%, the mean tumor volume of AP163 0.1 mg/kg test group was 8.00+5.24mm$^3$, and TGI % was 99.51%. The experimental results show that the antibody AP163 has a very significant anti-tumor effect. Under the experimental conditions, AP163 significantly inhibited the growth of tumor at all concentrations, and AP163 also showed good safety, without obvious toxic effects on experimental animals.

(4) NPG Mice Were Subcutaneously Inoculated With Human CIK Cells and Human Burkkit'S Lymphoma Daudi Cells to Make a Transplanted Tumor Model.

Daudi cells of human Burkkit's lymphoma were mixed with CIK (the density of Daudi cells is 5×10$^6$ cells/ml, the density of CIK cells is 1×10$^6$ cells/ml) and Matrigel in a volume ratio of 1:1, and inoculated subcutaneously on the right back of female NPG mice. One hour after inoculation, mice were randomly divided into 6 groups according to their body weight. On the same day of grouping, the control group was administrated the same volume of PBS solution, the administration doses of the experimental group of AP163 was 1 mg/kg, 0.2 mg/kg and 0.04 mg/kg respectively. All groups were administrated intraperitoneal injection once every two days for 8 times, and the experiment ended 10 days after the last administration.

The tumor volume and weight were measured twice every week, and the weight and tumor volume of mice were recorded. At the end of the experiment, the animals were euthanized, and the tumors were stripped, weighed and photographed, and the relative tumor inhibition rate (TGI %) was calculated.

Figure 11:
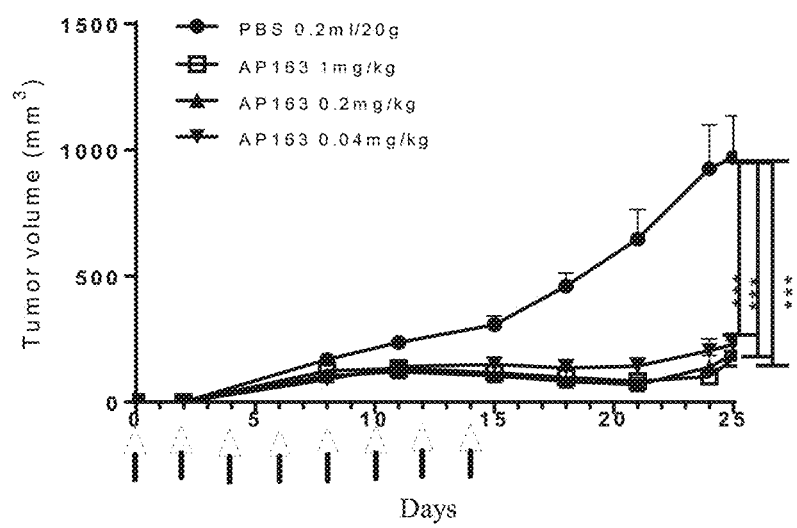
FIG. 11, in vivo anti-tumor effect of bispecific antibody in the transplanted tumor model of subcutaneous co-inoculation of human CIK cells and human Burkkit's lymphoma Daudi cells in NPG mice. Note: The arrow represents the time of each administration; * * * indicates that there are significant differences.

The results are shown in FIG. 11. at the end of the experiment (25 days after the first administration), the weight of animals in each group increased, with no significant difference compared with the control group (P>0.05). At the end of the experiment, the average tumor volume of the control group was 970.83+165.40mm$^3$; the mean tumor volumes of AP163 1 mg/kg, 0.2 mg/kg and 0.04 mg/kg groups were 171.99+32.60mm$^3$, 190.82-53.60mm$^3$ and 228.68+44.96mm$^3$ respectively, and the corresponding TGI % were 82.28%, 80.34% and 76.44% respectively, and compared with the control group, the anti-tumor effects were significantly different (P<0.05), which indicated that AP163 could significantly inhibit the growth of tumor at all drug concentrations, and it was safe and had no obvious toxic effect on experimental animals.

Embodiment 6 Safety Evaluation Test of Anti-BCMA×CD3 Bispecific Antibody

To evaluate the toxic reaction of AP163 given twice a week by repeated intravenous infusion to cynomolgus monkeys for 2 weeks, and to determine the appropriate dose range and observation index for the subsequent toxicity test. Six cynomolgus monkeys, 3 males and 3 females, were divided into three groups, one male and one female/group, and were given AP163 at 0.1, 0.5 and 2.5 mg/kg respectively (Group 1, 2 or 3). The infusion rate was 30 mL/kg/h and the administration volume was 10 mL/kg. All animals were euthanized on D15 after the end of the 14-day (D14) administration period.

During the experiment, the clinical symptoms, body weight, food intake, body temperature, electrocardiogram, blood pressure, clinical and pathological indicators (blood cell count, coagulation function indicators and blood biochemistry), lymphocyte subsets, cytokines, drug plasma concentration determination and toxicity analysis were monitored periodically. All animals were dissected roughly. Gross anatomical observation showed no obvious abnormality, and no histopathological examination was performed. The results showed that under the experimental conditions, AP163 of 0.1, 0.5 and 2.5 mg/kg was administered twice a week, and repeatedly given to cynomolgus monkeys by intravenous infusion for 2 weeks, and no death or near-death was found in all animals of each administration group, ransient decreases of Neut, CD3-CD20+, TNF-α, IL-2 and IL-6 and Lymph, CD3+, CD3-CD16+/CD56+ were observed after the first administration., maximum tolerated dose (MTD)≥ 2.5 mg/kg.

Embodiment 7 Pharmacokinetic Test of
Anti-BCMA×CD3 Bispecific Antibody

A total of 6 cynomolgus monkeys (3 males and 3 females) were divided into 3 groups, 1 male and 1 female/group, and were given AP163 at 0.1, 0.5 and 2.5 mg/kg respectively. Toxic blood samples (about 1 mL) were collected from the non-administration site of subcutaneous vein of hind limbs of animals to the tubes without anticoagulants, the time points of blood collection in groups 1 to 3 were as follows: before the first and last administration, immediately after the end of administration (+1 min), and 1 h, 3 h, 6 h, 8 h, 24 h, 48 h and 72 h after the start of administration.

Centrifugal tubes (not anticoagulated) shall be stored in ice water bath before use; after blood samples were collected, they were transferred to the centrifuge tube, and then centrifuged at 2~8° C. and 3000×g for 10 min. After separating serum samples, divide them into 2 parts and store them below −70° C. Blood sample collection and centrifugation should be completed within 2 hours.

ELISA method was used to detect and analyze the concentration of AP163 in serum, and non-atrioventricular model (NCA) method of WinNonlin 8.0 software was used to calculate the pharmacokinetic parameters of each group. The results showed that the in vivo half-lives of AP163 in 0.1, 0.5 and 2.5 mg/kg groups were 7.08, 8.95 and 11.42 hours respectively.

TABLE 6 calculation of pharmacokinetic parameters of AP163 after intravenous injection of cynomolgus monkeys

| Dose (mg/kg) | t½ (h) | Tmax (h) | Cmax (μg/mL) | AUClast (h*μg/mL) | AUCINF (h*μg/mL) | Vz (mL/kg) | Cl (mL/h/kg) |
|---|---|---|---|---|---|---|---|
| 0.1 | 7.08 | 0.66 | 2.12 | 20.95 | 21.14 | 48.74 | 4.76 |
| 0.5 | 8.95 | 1 | 12.49 | 120.19 | 120.64 | 60.92 | 4.55 |
| 2.5 | 11.42 | 0.66 | 48.08 | 430.37 | 431.62 | 94.45 | 5.84 |

While preferred embodiments of the present invention have been illustrated and described, it should be understood that various changes can be made by those skilled in the art in light of the teachings herein without departing from the scope of the present invention.

All documents mentioned in the present invention are incorporated by reference in this application as if each document were individually incorporated by reference. In addition, it should be understood that after reading the foregoing teaching contents of the present invention, those skilled in the art can make various modifications or changes to the present invention, and these equivalent forms also fall behind the scope defined by the appended claims of this application.

What is claimed is:

1. A method of treating or improving a plasma cell disorder, a B cell disorder associated with a B cell maturation antigen (BCMA) expression, or an autoimmune disease, comprising a step of administering to a subject in need thereof with an effective amount of a bispecific antibody,
   wherein the plasma cell disorder is selected from a group consists of multiple myeloma, plasmacytoma, plasma cell leukemia, macroglobulinaemia, amyloidosis, Waldenstrom's macroglobulinaemia, solitary bone plasmacytoma, extramedullary plasmacytoma, osteosclerotic myeloma, a heavy chain disease, monoclonal gammopathy of undetermined significance and smoldering multiple myeloma;
   wherein the bispecific antibody is composed of two identical polypeptide chains bonded covalently to form a tetravalent homodimer, wherein each of the polypeptide chains has an amino acid sequence as set forth in SEQ ID NO: 20, wherein each of the polypeptide chains consists of an anti-BCMA (B cell maturation antigen) scFv, a linker peptide L2, an anti-CD3 scFv, and an Fc fragment in order, wherein VH (heavy chain variable region) and VL (light chain variable region) within the anti-BCMA scFv and the anti-CD3 scFv are connected by a linker sequence respectively, and wherein the amino acid sequence of the linker sequence is amino acids 3-17 of SEQ ID NO: 10, wherein the amino acid sequences of the VH and the VL of the anti-BCMA scFv are SEQ ID NO: 7 and SEQ ID NO: 8, respectively, wherein the amino acid sequences of the VH and the VL of the anti-CD3 scFv are SEQ ID NO: 17 and SEQ ID NO: 18, respectively, wherein the linker peptide L2 consists of a flexible peptide and a rigid peptide, wherein the amino acid sequence of the flexible peptide is SEQ ID NO: 29, and wherein the amino acid sequence of the rigid peptide is SEQ ID NO: 24.

* * * * *